US00RE39809E

(19) United States
(12) Reissued Patent
Holsinger et al.

(10) Patent Number: US RE39,809 E
(45) Date of Reissued Patent: Sep. 4, 2007

(54) HARD SECTORING CIRCUIT AND METHOD FOR A ROTATING DISK DATA STORAGE DEVICE

(75) Inventors: Steven V. Holsinger, deceased, late of Oklahoma City, OK (US); by Joanne A. Holsinger, legal representative, Oklahoma City, OK (US)

(73) Assignee: Research Investment Network, Inc., Long Beach, CA (US)

(21) Appl. No.: 09/906,308

(22) Filed: Jul. 16, 2001

(65) Prior Publication Data

US 2002/0057516 A1 May 16, 2002

(Under 37 CFR 1.47)

Related U.S. Patent Documents

Reissue of:
(64) Patent No.: 5,050,013
Issued: Sep. 17, 1991
Appl. No.: 07/519,497
Filed: May 4, 1990

U.S. Applications:
(63) Continuation of application No. 08/116,470, filed on Sep. 2, 1993, now Pat. No. Re. 37,818, which is a continuation of application No. 07/445,753, filed on Dec. 4, 1989, now abandoned.

(51) Int. Cl.
*G11B 15/18* (2006.01)
*G11B 5/596* (2006.01)

(52) U.S. Cl. ..... 360/72.1; 360/78.04

(58) Field of Classification Search ..... 360/40, 360/48, 51, 72.1, 73.03, 77.08, 78.04, 27, 360/39, 49, 72.2, 77.05, 77.02, 78.08, 71; 369/32, 33, 41, 47, 50, 56, 57, 59, 53

See application file for complete search history.

(56) References Cited

U.S. PATENT DOCUMENTS 4,048,660 A 9/1977 Dennison et al. ..... 360/77.08
4,432,025 A 2/1984 Grogan ..... 360/48
(Continued)

*Primary Examiner*—David Hudspeth
*Assistant Examiner*—Mitchell Slavitt
(74) *Attorney, Agent, or Firm*—Steve A. Wong; Caroline T. Do

(57) ABSTRACT

[An apparatus for providing sector location pulses to a controller of a rotating disk data storage device having a counter clocked in proportion to the disk rotation rate and an accumulator for accumulating times to sectors on the disk. A comparator connected to the counter and the accumulator enables an accumulator clock for repetitive clocking of the accumulator at such times the contents of the accumulator do not exceed the contents of the counter. A sector location pulse generator connected to the comparator generates the controller pulses, when enabled, concurrently with the accumulator clock signals. A master reset generator resets the first counter and the accumulator each time an index location on the disk passes a transducer head used to read and write data to and from the disk and a partial reset generator resets the accumulator each time the transducer head is moved between tracks on the disk. The sector location pulse generator includes a flip-flop that is set following a partial reset signal to prevent sector location pulses from being generated following partial reset until the accumulator has accumulated the count in the counter.] *An apparatus for determining a sector location in a disk. A location circuit is configured to determine an angular location of a transducer head according to a selected index location on the disk. A memory is used to store a first value that corresponds to a selected angular distance along a selected track on the disk. An accumulator is configured to add the first value to the value of the content of the accumulator in response to an accumulator clock signal. A comparator is coupled to the location circuit and the accumulator to compare data related to the angular location and the content of the accumulator to generate a result. A generator is coupled to the comparator to provide a sector location signal in response to the result.*

40 Claims, 11 Drawing Sheets

U.S. PATENT DOCUMENTS

| | | | | |
|---|---|---|---|---|
| 4,514,771 | A | 4/1985 | Stark et al. | 360/73.03 |
| 4,577,240 | A | 3/1986 | Hedberg et al. | 360/22 |
| 4,641,294 | A | 2/1987 | Yoshimaru | 369/32 |
| 4,656,532 | A | 4/1987 | Greenberg et al. | 360/49 |
| 4,714,967 | A | 12/1987 | Bizjak | 360/48 |
| 4,757,406 | A | 7/1988 | Stewart | 360/51 |
| 4,780,866 | A | 10/1988 | Syracuse | 369/39.14 |
| 4,799,112 | A | 1/1989 | Bremmer et al. | 360/31 |
| 4,819,095 | A | 4/1989 | Asano et al. | 360/77.04 |
| 4,825,321 | A | 4/1989 | Hassel et al. | 360/51 |
| 4,999,720 | A | 3/1991 | Wilson et al. | 360/48 |
| 5,068,755 | A | 11/1991 | Hamilton et al. | 360/72.1 |

HARD SECTORING CIRCUIT AND METHOD FOR A ROTATING DISK DATA STORAGE DEVICE

Matter enclosed in heavy brackets [ ] appears in the original patent but forms no part of this reissue specification; matter printed in italics indicates the additions made by reissue.

CROSS REFERENCE TO RELATED APPLICATIONS

*Notice: More than one reissue application has been filed for the reissue of U.S. Pat. No. 5,050,013. The reissue application are Ser. Nos. 08/116,470 and 09/906,308.* This application is a continuation to United States Patent Application entitled HARD SECTORING CIRCUIT AND METHOD FOR A ROTATING DISK DATA STORAGE DEVICE, *Ser. No. 08/116,470, filed Sep. 2, 1993, now U.S. Pat. No. RE 37,818, which is a reissue of U.S. patent application Ser. No. 07/519,497, filed May 4, 1990, now U.S. Pat. No. 5,050,013, which is a continuation of* Ser. No. [445,753] *07,445,753*, filed Dec. 4, 1989, and now abandoned.

BACKGROUND OF THE INVENTION

1. Field of the Invention

The present invention related generally to improvements in rotating disk magnetic data storage devices, and, more particularly, but not by way of limitation to improvements in locating data sectors on the disks of such devices.

2. Brief Description of the Prior Art

In rotating disk magnetic data storage devices, data is stored in sectors extending angularly along concentric data tracks defined on the disks of the device. The disks have magnetizable surface coatings. Data is written and subsequently read by transducer heads that fly over the surfaces of the disks to magnetize cells of the surface coating, for writing, or respond to differences in magnetization of adjacent cells for reading. Both operations are controlled by a read/write controller that provides encoded data to the transducer head during writing and receives emf pulses from the transducer heads during readback of the data.

For such a system to operate, it is necessary for the sectors to be located prior to reading or writing and it is common practice to encode a data sector with a header that identifies the sector. Some means must be provided to supply sector location pulses to the controller to enable reading of information on the track as the transducer head approaches alignment with the header. Once the appropriate sector has been reached, reading or writing of data from or to the disk can proceed.

In the past, it has been common practice to include address marks on the disks that violate the code used in writing the data and the headers. A circuit can then be constructed to search for the address marks which the controller will place at the beginning of the sector. Such a circuit then provides the "sector" location pulses to the read/write controller.

The use of address marks on a disk suffers from the disadvantage that the marks can be lost for any of a number of reasons; for example, through flaws in the magnetic medium in which the data is written or accidental turn on of a write gate, used to enable writing, as a transducer head passes over an address mark. In this case, the data stored in the sector for that address mark has been lost. That sector's data can never be retrieved because the controller will never receive the pulses necessary for locating the sector. Similarly, read errors while searching for the address mark may cause a sector to be missed and lower the throughput of the data storage device.

The highly preferred alternative has been for the disk storage device to output sector location pulses at the required regular interval without having to write or recover any special data on the disk media itself. This is usually done with a simple circuit that counts out desired time (or number of bytes) in a sector before issuing the next sector location pulse. This simple circuit has been referred to as hard sectoring. Simple hard sectoring has proven adequate for decades of years because the time when sector location pulses should occur has been identical on every track of the disk storage device.

The problem is exacerbated by other requirements placed on a rotating disk data storage system. As is well known, it is desirable to store as much data on a disk as possible and this desire has lead to the recording of data at different frequencies on different tracks of the disk as taught by Bremmer et al. in U.S. Pat. No. 4,799,112 issued Jan. 17, 1989, the teachings of which are hereby incorporated by reference. With recording of different tracks at different frequencies, sectors on different tracks occupy different angular lengths that take differing times to pass by a transducer head. Accordingly, for rotating disk data storage devices that utilize different data transfer rates for different tracks, sector location pulses must be supplied to the controller at different rates that depend upon the radial location of the transducer head on the disk. As a result, it has been necessary in the past to either forego recording tracks at different frequencies or use address marks, despite the disadvantage of much lower data security.

SUMMARY OF THE INVENTION

The present invention provides an advanced hard sectoring circuit and method for generating the sector location pulses that is particularly suited to data storage devices in which data is recorded at different transfer rates on different track radii to maximize storage of data by the device. To this end, the hard sectoring circuit is comprised of a master clock generator that is synchronized with the rotation rate of the disk to produce master clock signals that are indicative of distances along the disk and a master reset generator that marks passage of an index location defined on the servo disk by the servo transducer head. The master clock signals are utilized to clock a counter following resetting by a master reset signal generated by the master reset generator so that the counter provides a continuous indication of the location, or time from index, of the transducer head with respect to the index location on the disk. An accumulator and latch assembly are used to accumulate next sector times in response to accumulator clock pulses that are generated by an accumulator clock that is enabled by a comparator whenever the time from index counter exceeds or equals the next sector time in the accumulator. Thus, the accumulator will be increased by one sector time each time the time from index counter reaches a sector pulse location. Concurrently with the generation of the accumulator clock signals, a sector location pulse generator, also connected to the comparator, generates the sector location pulses to the controller. The accumulator, as well as the counter, is reset by the master reset generator so that, subsequent to reset, a sector location pulse is generated each time a new sector is brought into angular alignment with a transducer head.

The circuit further comprises a partial reset generator that provides a partial reset signal to the accumulator each time the transducer head is moved from one track to another so that the accumulator clock will operate repetitively following a partial reset signal until the count in the accumulator reaches the time from index stored in the counter. The partial reset signal is further provided to the sector location pulse generator to disable generation of the sector location pulses until the comparator provides an indication that the contents of the accumulator has risen to the time from index stored in the counter. The partial reset signal is triggered by entry of sector times for the new track into a latch assembly that supplies time to be accumulated to the accumulator. Thus, each time the transducer heads are moved to a new track, the next sector time for the new track is accumulated by the accumulator while the sector location pulses are suppressed until the time from index in the counter is reached by the accumulator. Generation of the sector location pulses then ensues as if the transducer head had been following the new track to which it has been moved.

An object of the invention is to reliably provide sector location pulses for locating sectors on data storage disks.

Another object of the invention is to provide a circuit for providing sector location pulses for locating sectors on disks of a rotating disk data storage device that does not depend upon address marks on the disks.

Still a further object of the invention is to provide hard sectoring of rotating disk data storage devices that write data to different data tracks at different transfer rates.

Other objects, features and advantages of the present invention will become apparent from the following detailed description when read in conjunction with the drawings and appended claims.

DESCRIPTION OF THE PREFERRED EMBODIMENT

Figure 1:
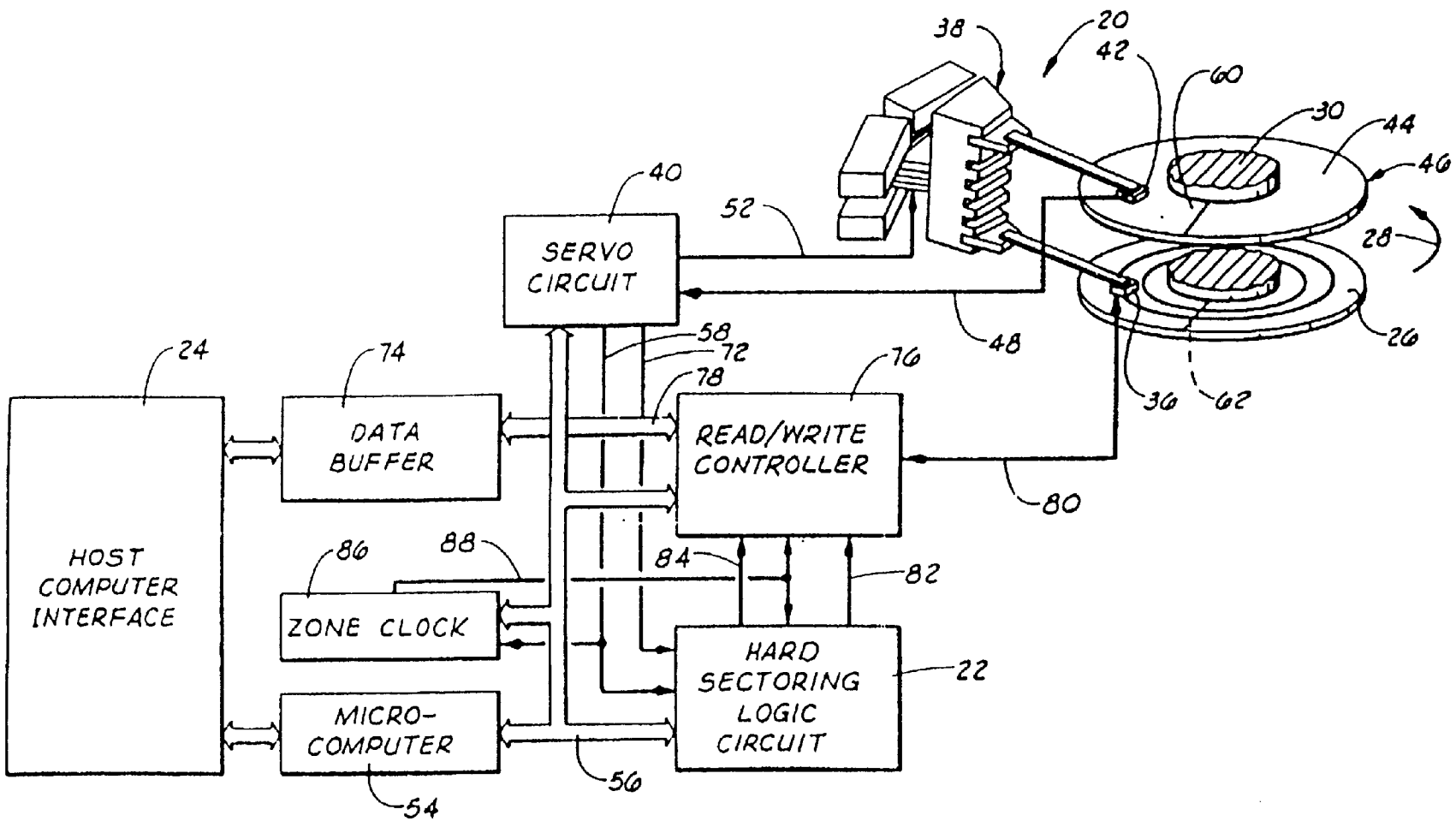
FIG. 1 is a schematic diagram of a rotating disk data storage including the hard sectoring logic circuit of the present invention.
Figure 2:
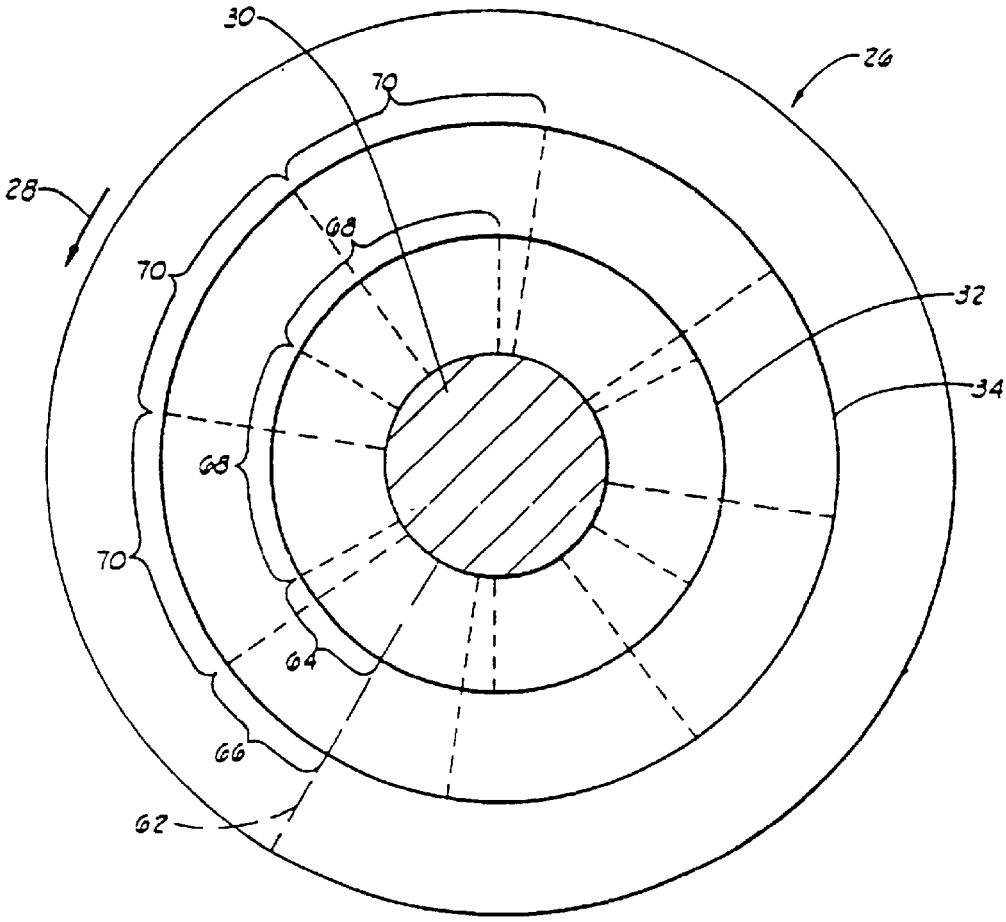
FIG. 2 is a drawing of a data storage disk indicating the sectoring of the disk.

Referring now to the drawings in general and to FIGS. 1 and 2 in particular, shown therein and designated by the general reference number 20 is a rotating disk data storage device including a hard sectoring logic circuit 22 constructed in accordance with the present invention. As is conventional, the data storage device 20 is constructed to receive information from a host computer (not shown) via an interface 24 and store the information on a data storage disk, such as the disk 26 shown in FIGS. 1 and 2, that rotates in the direction indicated at 28 on a spindle 30. (As is known in the art, the device 20 will be comprised of a plurality of data storage disks. For clarity of illustration, only one data storage disk has been shown in the drawings.) Subsequently, the information is read from the disk 26 and returned to the host computer via the interface 24.

As shown in FIG. 2, the information received from the host computer is written to angularly extending sectors on concentric data tracks, two of which are illustrated and designated by the numerals 32 and 34, by a transducer head 36 that is supported by an electromechanical actuator 38 that moves the transducer head 36 to selected tracks in a manner that, while conventional, will now be described to provide a basis for an understanding of the invention.

For purposes of illustration, the drawings contemplate that the data storage device 20 will be of the type in which positioning of the transducer heads used to write data to a disk is carried out by a servo circuit 40 in response to electrical signals received from a servo head 42 that is supported by the actuator 38, in alignment with the transducer head 36, adjacent a dedicated servo surface 44 on a disk 46 that is mounted on the spindle 30 to rotate with the disk 26. A servo pattern (not shown) is magnetically written on the surface 44; for example, the surface 44 may contain a tri-phase servo pattern as described in U.S. Pat. No. 4,811,135 issued Mar. 7, 1989 to Donald W. Janz, and the servo head responds to passage of elements of the pattern to provide position error signals to the servo circuit 40 on a conducting path 48. In particular, the servo pattern defines concentric servo tracks that are aligned with the data tracks and the position error signals provide an indication of the position of the servo head with respect to the nearest servo track. The servo circuit 40 provides control signals to the actuator 38, on a conducting path indicated at 52 in FIG. 1, that maintain the servo head in alignment with a selected servo track and, accordingly, maintain the transducer head in alignment with a selected data track in a track following mode of operation of the device 20. The servo circuit 40 also receives positioning signals from a microcomputer 54 on a data bus 56 to cause the servo circuit 40 to provide appropriate signals to the actuator 38 for moving the servo and transducer heads between tracks in a conventional manner. Thus, upon command received by the microcomputer 54 from the host computer via the interface 24, the microcomputer 54, servo circuit 40 and actuator 38 operate to move the transducer heads to a selected track at which data is to be stored. While the above description of the servo system for the data storage device has been presented to provide a clearer understanding of the invention to be described below, it will be recognized that the use of the invention is not limited to data storage devices using a dedicated servo surface for radially positioning the transducer heads that write and read information received from a host computer. Rather, it is contemplated that the hard sectoring logic circuit 22 can equally well be used in data storage devices that use a scheme in which the servo patterns are embedded in the data tracks to maintain track following and for moving the transducer heads from one track to another.

It is also contemplated that the hard sectoring logic circuit can be used in data storage devices that position the head using a stepper motor actuator or any other positioning system.

As is also conventional, the servo circuit 40 is comprised of a servo PLO (not shown) that generates servo clock signals that are synchronized with the rotation of the disks, 26 and 46, so that distances along the tracks 32 and 34 are equivalent to times measured in servo PLO clock pulses. These pulses are transmitted to the hard sectoring logic circuit 22 on conducting path 58 for use in generating master clock signals for the circuit 22 in a manner and for a purpose to be discussed below. Additionally, the servo pattern will include a radially extending series of elements that provides an index indicated by the line 60 in FIG. 1. Corresponding to the index 60, each of the data storage disks will have defined therefor an index location, indicated by the dashed line 62 in FIGS. 1 and 2, that serves as an origin for defining data sectors along the data tracks. In the present invention, it is contemplated that a delayed index can be used in defining the data sector locations so that the general lay out of the data tracks will generally follow the scheme indicated for the tracks 32 and 34 in FIG. 2; that is, beginning from the index location, each track will contain a delayed index portion, 64 for the track 32 and 66 for the track 34, that extends a selectable skew distance from the index location followed by a plurality of data storage sectors indicated at 68 for the track 32 and at 70 for the track 34. Since the rotation of the disks is synchronized with the generation of PLO clock signals, the skew distances and sector lengths correspond to delayed index times and sector times that are used in the invention in a manner to be discussed below. As will also be discussed below, the sector times, and lengths, will be the same for all sectors along a particular track but will vary for different tracks. The servo circuit 40 is further constructed to provide a servo index pulse to the hard sectoring logic circuit 22 on a conducting path 72 that defines the index location to the hard sectoring logic circuit 22.

For the reading and writing of data, the data storage device 20 is further comprised of a data buffer 74 which temporarily stores data to be exchanged between the host computer interface 24 and the read/write controller 76 that controls the transfer of data from the buffer to the disk 26. Thus, in the write mode, data in the buffer 74 is transferred, in parallel, on bus 78 to the controller 76 and serially written to the disk by signals transmitted on conducting path 80 from the controller to transducer head 36. It will thus be seen that the timing of placement of data bits on each data track, to fit a block of data within a sector, is effected by the controller 76. For such effectuation, the controller 76 must have knowledge of the beginning of each sector and, for formatting, the location of the first sector; that is, an index, on the disk. The hard sectoring logic circuit 22 provides sector location pulses, both index and sector, to the controller 76 on conducting paths 82 and 84 respectively to indicate to the controller the locations of the sectors on the disks.

As noted above, sector lengths for different data tracks will vary, such variation arising from the writing of data on different tracks at different rates as taught by Bremmer et al. in the aforementioned U.S. Pat. No. 4,799,112. To this end, the data storage device 20 is comprised of a zone clock 86 that receives the servo PLO clock signals from the conducting path 58 and is controlled by the microcomputer 54 to generate zone clock signals that are rational multiples of the servo PLO frequency. The zone clock signals are transmitted to the read/write controller 76, for establishing the transfer rate of data to the disks, and to the hard sectoring logic circuit 22, for synchronizing the sector location pulses from the circuit 22 to the controller 76 with the zone clock signals received by the controller, on a conducting path 88.

Figure 3:
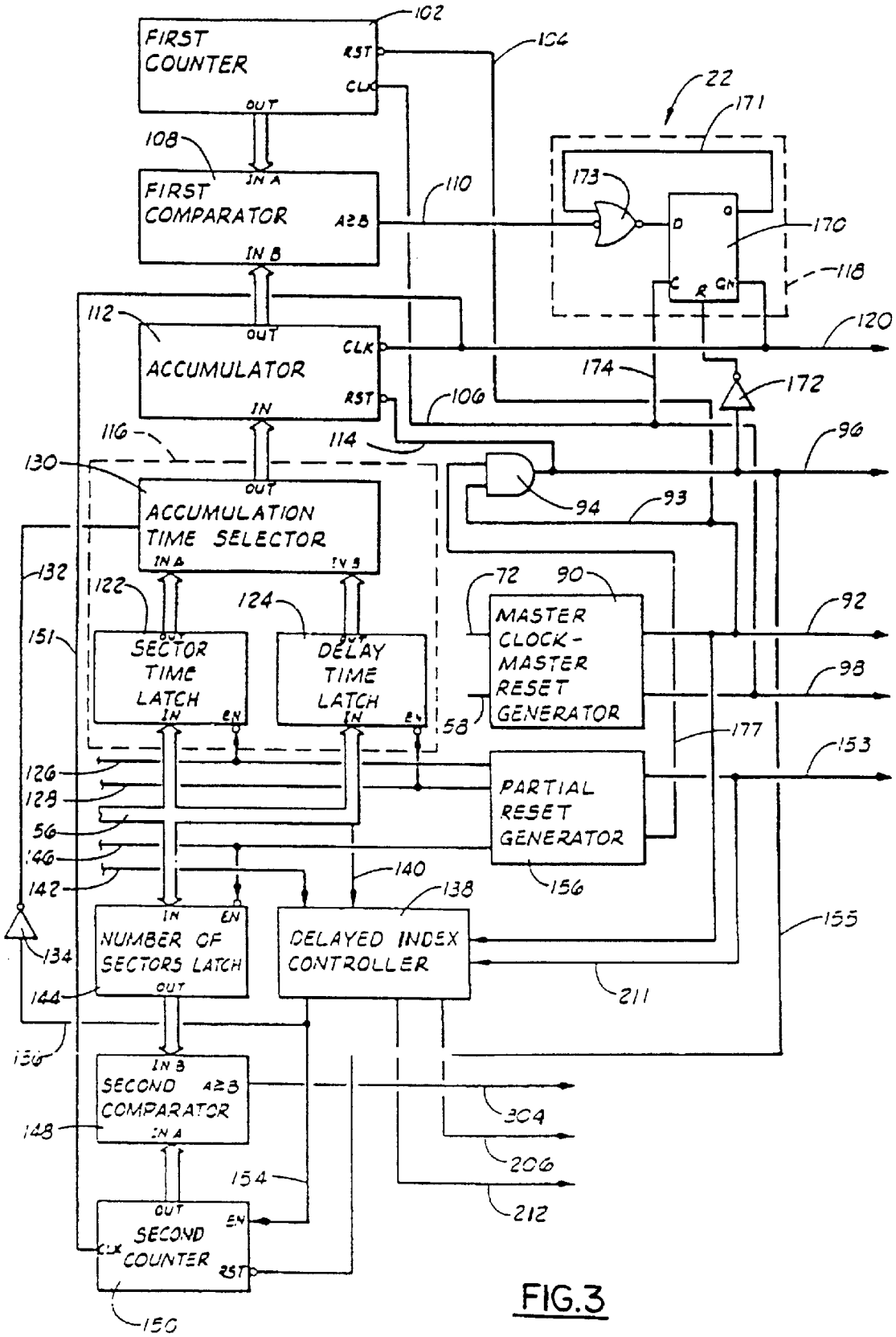
FIG. 3 is a schematic circuit diagram for a portion of the hard sectoring logic circuit.

With this introduction, attention is now invited to the hard sectoring logic circuit 22, major portions of which have been illustrated in FIG. 3. Remaining portions of the circuit 22 are a raw sector pulse generator 89 and an index-sector pulse generator 91. These, illustrated in FIGS. 11 and 9 respectively, together form a sector location pulse generator (not numerically designated in the drawings).

As can be seen in FIG. 3, the circuit 22 is comprised of a plurality of functional units that operate coactively to provide the controller pulses and it will be useful to briefly describe the functions of these units and to indicate the coactive relationships therebetween them before describing the structure and operation of each unit.

Prior to describing the circuit 22, it is noted that a preferred manner of fabrication of the circuit 22 is to place the circuit on a single silicon chip using large scale integration techniques. In doing so, the amount of chip surface used can sometimes be minimized by using negative logic in which active signals or states are implemented by a low voltage. Thus, a negative logic signal will be referred to herein as either "active low" or "inactive high". A positive logic signal will be referred to herein as either "active high" or "inactive low". An event or signal can sometimes be indicated by a momentary active state then immediately returning inactive. This will be referred to as a "positive pulse" if implemented in positive logic or a "negative pulse" if implemented in negative logic. Further, as will be recognized by those skilled in the art, it will be useful to position buffers and inverters at selected locations in the circuit to provide higher power driving capabilities for elements which are heavily loaded by other parts of the circuit. Since the use of inverters and buffers to increase the fan-out of a circuit component is well known, elements whose sole purpose is to increase fan-out have not been illustrated in order to facilitate the understanding of the invention.

As shown in FIG. 3, the hard sectoring logic circuit 22 is comprised of a master clock-master reset generator 90 that receives the servo index signal on path 72 and, in response, generates a negative pulse master reset signal each time the index location on the disks passes by the transducer heads. This master reset signal is outputted directly on conducting path 92 and, via an AND gate 94 and conducting path 93, also outputted on conducting path 96 as a negative pulse. (The numerical designations for the conducting paths 92 and 96 have been carried into remaining drawings as appropriate.) Additionally, the master clock-master reset generator 90 receives the servo PLO signals on the conducting path 58 and, in response, provides a master clock for the circuit 22, one phase of which is outputted on conducting path 98 and a second phase, 180 degrees from the first phase, of which is outputted on a conducting path 100 (not shown in FIG. 3). In the preferred construction of the invention, the master clock phases are derived from the servo PLO so that the master clock is synchronized with the rotation of the disks 46 and 26.

A first counter 102 has a reset terminal connected to the master reset via conducting path 104 and a clock terminal that receives the first phase of the master clock on a conducting path 106 so that, following a master reset, the first counter continuously counts a time from index from the passage of the index location on the servo disk 46 by the servo head 42. This time from index is compared with a next sector time; that is, the time the next sector location pulse should occur, to mark the beginning of the sector following that currently adjacent the transducer head 36, by a first comparator 108 which is a conventional gate circuit having A and B parallel inputs that [receive] *receives* signals indicative of a digitally expressed number. The first comparator is constructed to provide an inactive low output, on conducting path 110, at all times that the time from index expressed at the A input is less than the next sector time expressed at the B input and an active high output at such times that the time from index is equal to or exceeds the next sector time. The next sector time is provided by an accumulator 112 which is reset via a negative reset pulse supplied on a conducting path 114 from the AND gate 94.

Next sector times are accumulated in accumulator 112 using the output of a latch assembly 116, to be described below. The accumulator 112 is clocked, to enter the next sector time, by a negative pulse provided by an accumulator clock 118 on conducting path 120. As shown in FIG. 3, the accumulator clock 118 receives the output of the first comparator 108 so that clocking of the accumulator will occur, in a manner to be discussed below, when the time from index in the first counter reaches or exceeds the present next sector time stored in the accumulator 112. At present, it will be useful to note that the connections between the first counter, the first comparator, the accumulator, and the accumulator clock generator will result in the accumulator continuously storing and updating the time that the beginning of the next data sector on the disk will come into alignment with the transducer head 36.

As noted above, the next sector time accumulator 112 uses the output of latch assembly 116 which will now be discussed. The latch assembly 116 is comprised of a sector time latch 122 and a delay time latch 124 that are both connected to the microcomputer data bus 56 so that both the sector times corresponding to sectors 68, 70 and delay times corresponding to track portions 64, 66 in FIG. 2 can be entered into the latch assembly 116 by negative pulse latch enable signals received from the microcomputer on conducting paths 126, for latch 122, and 128, for latch 124. Additionally, the latch assembly 116 comprises an accumulation time selector 130 that receives the contents of both latches 122 and 124. The latch assembly 116 outputs the contents of the sector time latch 122 to the accumulator 112 in response to a low signal received on a conducting path 132. At such times that the signal on the conducting path 132 is high, the contents of the index delay time latch 124 will be transferred to the accumulator 112.

The conducting path 132 extends, via an inverter 134 and conducting path 136, from a delayed index controller 138 that receives a signal from one line 140 of the microcomputer data bus 56 and a negative enable pulse from the microcomputer 54 on conducting path 142 so that the delayed index controller can place the hard sectoring logic circuit 22 in either of a nondelayed index mode of operation, in which the index delay time is forced to zero, or a delayed index mode of operation in which the index delay time entered into the delay time latch 124 will be used.

The hard sector logic circuit 22 is further comprised of a number of sectors latch 144 which is connected to the data bus 56 to enter the number of sectors chosen for a data track in response to a negative enable pulse received from the microcomputer 54 on a conducting path 146. The number of sectors latch 144 provides such number to a second comparator 148 that also receives, for comparison, the output of a second counter 150 that is clocked by the trailing; that is, rising, edge of each negative accumulator clock pulse, via conducting path 120. Thus, the second counter 150 will count the number of sector location accumulations performed in accumulator 112 so that the second comparator 148 can indicate when the number of sectors stored in number of sectors latch 144 has passed the transducer head 36. The second counter 150 is reset each time the index location passes the servo transducer head 36 by a negative master reset pulse received from AND gate 94 via conducting paths 96 and 155. The second counter is also disabled, as will be discussed below, for the first accumulator clock signal when in the delayed index mode by a signal transmitted from the delayed index controller 138 on a conducting path 154. Such initial disablement prevents counting of the delayed index skew distance as a sector location in a manner that will be discussed below.

Finally shown in FIG. 3 is a partial reset generator 156 that provides negative partial reset pulses, via conducting path 177 and AND gate 94, that are used to reset the accumulator 112 and the second counter 150 each time the transducer head 36 is moved to a new track on *the* disk 26 in FIG. 1. (The positive pulse complement of the partial reset pulse is provided on a conducting path 153 for use in a manner to be discussed below. Additionally, since the AND gate 94 transmits a negative pulse corresponding to either a master reset pulse or a partial reset pulse, it will be useful to refer to the negative pulse issuing therefrom in either case as a combined reset pulse). To this end, the partial reset generator 156 is responsive, in a manner to be discussed below, to the latch enable signals appearing on the paths 126, 128 and 146 to generate the partial reset pulse during the microprocessor entry of changes in sector times, index delay times, and number of [sector] *sectors* for the track to which the transducer head 36 is to be moved during a zone change to a new data transfer rate.

After a partial reset due to a zone change, the contents of the first counter 102 exceed the contents of the accumulator 112 so that, for a time, the output of the first comparator 108 will remain high. The result, also to be discussed below, will be that the accumulator clock 118 will be continuously enabled to provide a series of accumulator clock signals on conducting path 120 that will clock the cleared accumulator 112 and second counter 150 until the contents of the accumulator 112 and second counter 150 reach the values appropriate to the new zone with respect to the current orientation of the transducer head 36 relative to the index location on the servo disk.

Thus, the general operation of the portion of the circuit 22 shown in FIG. 3 is to continuously count sectors following a master reset with the first comparator providing an electrical indication of the entry by the transducer head 36 into a new sector on the disk so long as a particular track is followed. During a change of tracks, a partial reset is generated that causes the second counter and accumulator to clear and then count the sectors that would have passed the transducer head and sector times that would have been accumulated had the transducer head been continuously over the new track. Thus, the next sector time, for the new track, and the number of sectors, again for the new track, are entered into the accumulator and the second counter respectively while the movement to the new track is accomplished by the servo circuit 40 under the control of the microcomputer 54. Thus, at all times other than the time necessary for the accumulator and second counter to reach the values appropriate to a new track during a movement of the transducer head between tracks, the circuit 22 will be in a state to generate correct sector location pulses that enable the read/write controller to locate sectors on the disk 26. The generation of these signals will be discussed below.

DETAILED DESCRIPTION OF COMPONENTS FOR FIG. 3

Figure 4:
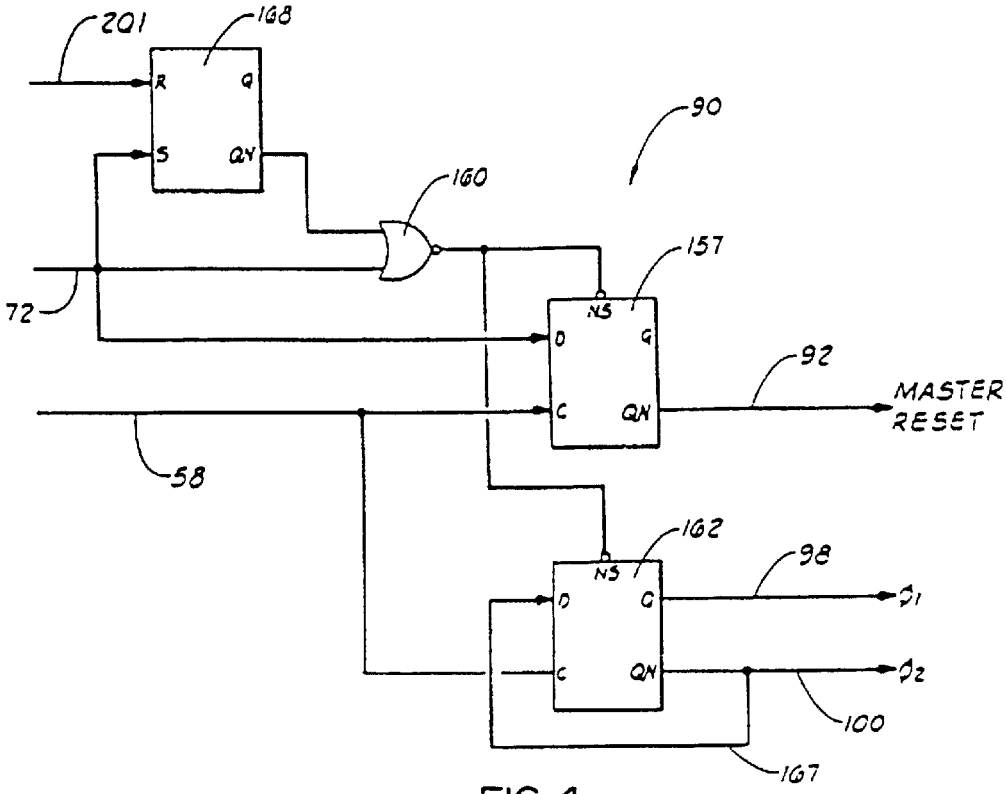
FIG. 4 is a circuit diagram for the master clock-master reset generator of the hard sectoring logic circuit.
Figure 5:
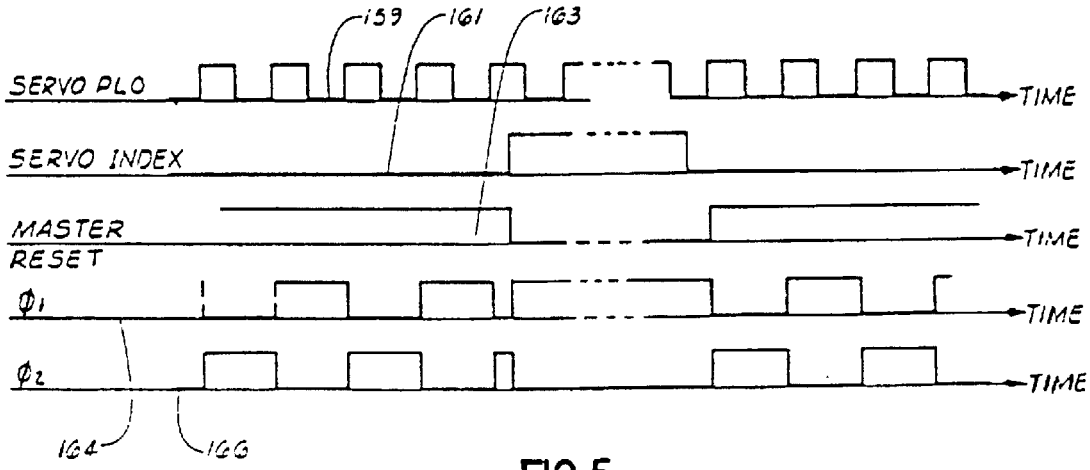
FIG. 5 is a timing diagram for the master clock-master reset generator.
Figure 6:
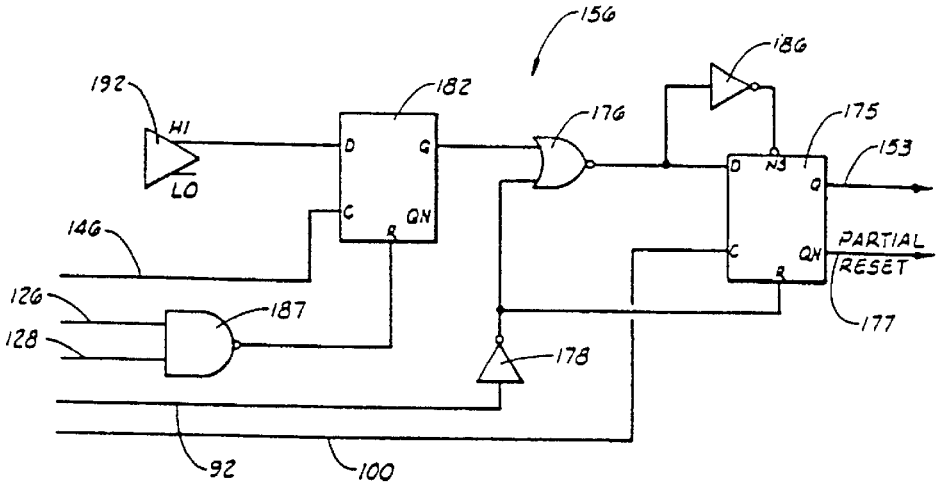
FIG. 6 is a circuit diagram for the partial reset generator of the hard sectoring logic circuit.

With this overview, attention is now invited to the components of the circuit 22 which are used in the operation generally described above. Referring first to FIGS. 4 and 5, shown therein respectively are the circuit for the master clock-master reset generator 90 and a timing diagram that illustrates the operation of the generator 90. As shown in FIG. 4, the generator 90 is comprised of a type D master reset flip-flop 157 that receives servo PLO clock signals (shown on time axis 159 in FIG. 5) on path 58 at its clock input and the servo index signal on conducting path 72 at its data input. Additionally, the flip-flop 157 has an active low set input that receives the servo index signal (time axis 161 in FIG. 5) on path 72 via a NOR gate 160. Thus, as the servo index signal, a positive pulse, rises, the output of the NOR gate goes active low to set the flip-flop 157. The master reset pulse on conducting path 92 (time axis 163 in FIG. 5) is delivered from the QN output of the flip-flop 157 so that the leading edge of the master reset, a negative pulse, commences with the rise of the servo index pulse as shown in FIG. 6. The master reset pulse then continues until the servo PLO clock pulse following the servo index pulse resets the flip-flop 157 as shown on time axes 161 and 163 in FIG. 5.

In addition to the master reset flip-flop 157, the master clock-master reset generator includes a type D master clock flip-flop 162 that also receives the inverted servo index pulse from NOR gate 160 at an active low set input for setting of the flip-flop 162 by the servo index pulse. Upon setting of the flip-flop 162, master clock signals generated thereby and appearing on the paths 98 and 100 connected to the Q and QN outputs of the flip-flop 162 are suppressed, as shown on times axes 164 and 166 for the first and second phases respectively, until the rise of the first servo PLO signal following the servo index signal. Thereafter, the master clock will provide pulses at half the frequency of the servo PLO due to the logic state at the QN output of flip-flop 162 entering the D input thereof via a conducting path 167 which will toggle the state of flip-flop 162 at the next rise of servo PLO clock signals on conducting path 58. Since the resumption of generation of the master clock signals occurs with the rise of the first PLO clock signal following the servo index signal, the above described synchronization of the PLO clock signals with the rotation of the disk 26 results in synchronization of the master clock for the circuit 22 with the rotation of the disk.

The master clock-master reset generator can further include an RS system reset flip-flop 168 that can be reset by a position pulse from the microcomputer 54 on conducting path 201 to effect a complete shutdown of the entire circuit 22 until the next servo index signal appears on conducting path 72. To this end, the QN output of the flip-flop 168 will go inactive high which is connected to a second input of NOR gate 160 to cause the output of such [gaste] *gate* to go low and set both flip-flops 158 and 162. At this point, the master reset remains active and the master clock is maintained in a set state. The set input of flip-flop 168 is connected to the path 72 whereon the servo index pulse is received so that the shutdown of the entire circuit 22 is discontinued by setting flip-flop 168 with the servo index pulse going active then inactive. This causes NOR gate *160* output to go inactive high and a subsequent resumption of master clock pulse generation at the next servo PLO clock signal.

Returning to FIG. 3, the accumulator clock generator 118 is comprised of a type D flip-flop 170 that is reset by the leading; that is, falling, edge of a master reset pulse appearing, as a combined reset from the AND gate 94, on conducting path 96 via an inverter 172. Subsequent operation of the accumulator clock 118 then depends upon the state of the first comparator 108. The output of the comparator 108 is connected to an inverting input of a NOR gate 173, the output of which is connected to the D input of the flip-flop 170, so that, at such times that the output of the first comparator 108 is low, the output of NOR gate 173 will be held low to maintain the Q output of the flip-flop 170 low. On the other hand, should the output of the comparator 108 be high, operation of NOR gate 173 will be controlled by the state of the flip-flop 170. In particular, the flip-flop 170 is continuously clocked by the first phase of the master clock, via conducting paths 98, 106 and 174, so that the rise of such phase of the master clock while the Q output of flip-flop 170 is low, such output being transmitted to the NOR gate 173 via conducting path 171 to provide a high voltage to the D input of flip-flop 170, will cause the Q output to go high. The rise of such phase while the Q output of flip-flop 170 is high will cause the Q output of flip-flop 170 to fall in reverse fashion. Thus, following a master reset of the circuit 22, the accumulator clock 118 will remain in a state in which the QN output of flip-flop 170 is high so long as the output of the first comparator remains low. Should the output of the first comparator go high, flip-flop 170 Q output is continuously clocked between high and low states by alternate master clock signals to provide a series of negative accumulator clock pulses on QN the conducting path 120 to the clock terminals of the accumulator and second counter.

Figure 7:
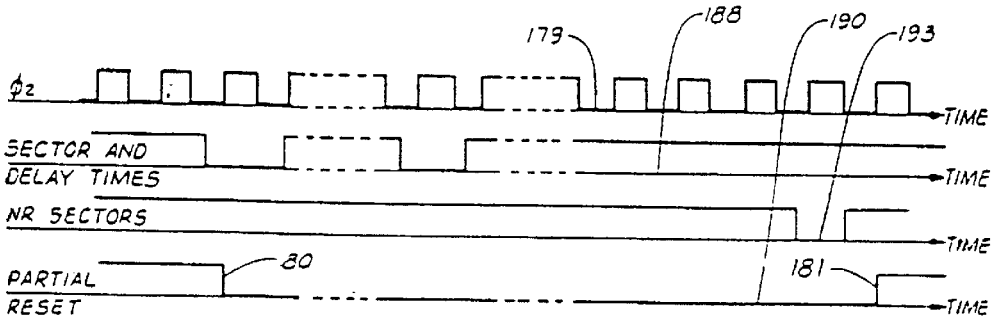
FIG. 7 is a timing diagram for the partial reset generator.

The circuit of the partial reset generator 156 has been illustrated in FIG. 6 and the operation of such circuit has been shown by a timing diagram in FIG. 7. As shown in FIG. 6, the partial reset generator 156 is comprised of a type D flip-flop 175 that receives the second phase of the master clock signal on conducting path 100 at the clock input thereof (time axis 179 in FIG. 7) and receives the output of a NOR gate 176 at the D input thereof. The Q and QN outputs of flip-flop 175 provide the positive pulse complement of the partial reset pulse (on path 153) and the partial reset negative pulse itself (on path 177) respectively. The flip-flop 175 is reset via an inverter 178 that is connected to the conducting path 92 shown in FIG. 3 that carries the negative pulse master reset signal. This reset serves to suppress the partial reset during a master reset of the circuit for a purpose that will become clear below.

In addition to the flip-flop 175, the partial reset generator 156 includes a second type D flip-flop 182 having a Q output connected to one input of the NOR gate 176. The other input of the NOR gate 176 is connected to the [inverted] *inverter* 178, so that the reset of the flip-flop 182, in the absence of a master reset on the conducting path 92, will cause the output of the NOR gate 176 to be high. Such output is connected via an inverter 186 to an inverting set input of flip-flop 175 so that flip-flop 175 is set to provide the leading edge of a negative partial reset pulse with the reset of flip-flop 182. Such reset is effected upon entry of sector and delay times into the latches 122 and 124 via connection of the active low latch enable conducting paths 126 and 128 to the inputs of a NAND gate 187 whose inverting output is connected to the reset input of the flip-flop 182. Thus, as shown on time axes 188 and 190, initiation of a partial reset pulse begins with the entry of the sector times and delayed index times into the latches 122 and 124. The partial reset is terminated with the entry of the number of sectors into the latch 144; in particular, the D input of the flip-flop 182 is connected to the high terminal of a pull-up 192 and the clock terminal of the flip-flop 182 is connected to the conducting path 146 that is used to enable the latch 144. Thus, at the end of the entry of the number of sectors by a negative latch pulse to the latch 144, the Q output of the flip-flop 182 is clocked high to cause the output of the NOR gate 176 to go low and allow the QN output of flip-flop 175 to rise, ending the partial reset pulse, at the rise of the second phase of the next master clock signal that is transmitted to the clock input of flip-flop 175 on the conducting path 100 from FIG. 4. Thus, a negative partial reset pulse is initiated, as shown at 180 on the time axis 190 in FIG. 7, with entry of sector and delay times into the latches 122 and 124 and terminated with the occurrence of the first master clock pulse following completion of entry of the number of sectors into latch 144 as shown at 181 in FIG. 7.

Figure 8:
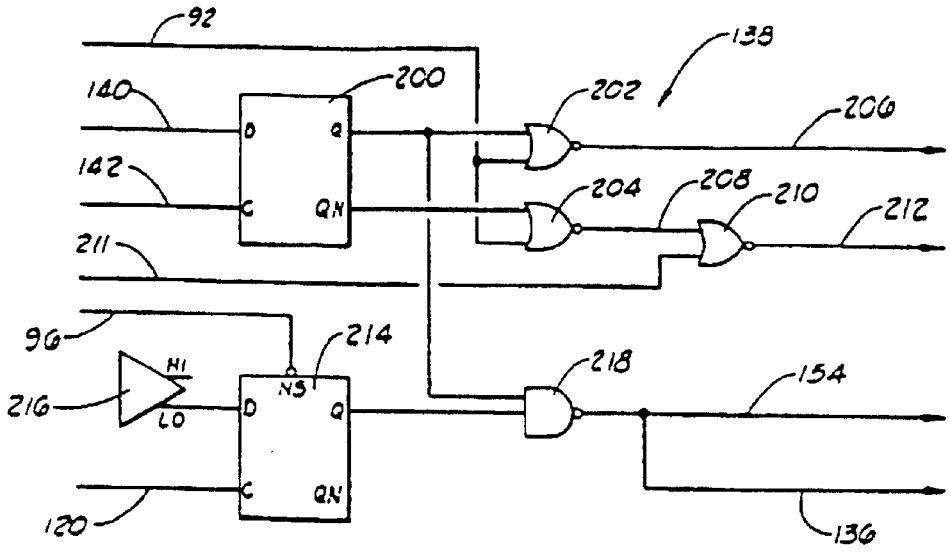
FIG. 8 is a circuit diagram for a delayed index controller of the hard sectoring logic circuit.

Referring now to FIG. 8, the delayed index controller 138 is comprised of a type D flip-flop 200 having a D input connected to the line 140 of the data bus 56 and a clock input connected to the conducting path 142 from which a negative pulse enable signal is received from the microcomputer 54. Thus, the flip-flop 200 can be clocked high or low by providing an appropriate data byte on the bus 56 while concurrently providing an enable pulse on the conducting path 142. In the present invention, the delayed index mode of operation of the hard sectoring logic circuit 22 is selected by clocking the Q output of flip-flop 200 high. A low state of the Q output of the flip-flop selects the nondelayed index mode of operation.

The Q output of flip-flop 200 is connected to one input of a NOR gate 202 and the QN output thereof is connected to one input of a NOR gate 204. The other input of each of the gates 202 and 204 is connected to conducting path 92, to receive the negative master reset pulses generated by the master clock-master reset generator 90. Since clocking the Q output of the flip-flop 200 high, for the delayed mode of operation of the hard sector logic circuit 22, of the flip-flop 200 will place a high voltage on one input of the NOR gate 202, gate 202 is uneffected by master reset pulses so that its output on conducting path 206, referred to herein as an output index conducting path, remains inactive low and its operation in the delayed index mode need not be further considered.

The connection of one input of the gate 204 to the QN output of flip-flop 200, on the other hand, causes the NOR gate 204 to invert the negative master reset pulses on the conducting path 92 in the delayed index mode and produce a positive mask delayed index pulse at conducting path 208. The conducting path 208 leads to one input of a NOR gate 210, the other input of which receives the positive pulse complement of the partial reset pulse on the conducting path 153. Thus, either a mask delayed index pulse or the positive complement of a negative partial reset pulse, received on conducting path 211 shown in FIG. 3, at either input of NOR gate 210 will result in a negative pulse output at a mask first sector output of NOR gate 210. Thus, in the delayed index mode of operation of the circuit 22, the output index conducting path 206 is always held inactive low while the gates 204 and 210 transmit either a master reset pulse or a partial reset pulse through to the mask first sector output conducting path 212. The result of such transmittal will be discussed below.

At such times that the flip-flop 200 is reset; i.e., in the nondelayed index mode of operation, one input of NOR gate 202 will be low while the other input will be high in the absence of a master reset pulse. Thus, the NOR gate 202 will provide a positive pulse on the output index conducting path 206 in response to a negative master reset pulse. The NOR gate 204 will, on the other hand, have a high voltage at one input in this mode of operation to provide an inactive low voltage on the mask delayed index conducting path 208 so that operation of NOR gate 210 is effected solely by partial reset pulse complements appearing on conducting paths 153 (FIG. 3) and 211. Thus, the operation of of the gates 202, 204, and 210 in the nondelayed index mode of operation is to provide positive pulses on the conducting path 206 in response to master reset pulses and to provide negative pulses on the conducting path 212 in response to partial reset pulses. The effect of this operation will be discussed below.

Additionally, the delayed index controller 138 is comprised of a type D flip-flop 214 having an active low set terminal connected to the conducting path 96 from the output of the AND gate 94 that provides a negative combined reset pulse on conducting path 96 whenever a master reset or partial reset pulse is generated. Thus, the flip-flop 214 is set on either of these occasions. The D input of flip-flop 214 is connected to the low output of a pull-down 216 and the clock input of flip-flop 214 is connected, via connecting path 120 shown in FIG. 3 and carried into FIG. 8, to the inverting output of the flip-flop 170 that provides the negative pulse accumulator clock signals. Thus, following setting of the flip-flop 214, the Q output of such flip-flop is clocked low by the trailing edge of the first accumulator clock pulse to occur thereafter. The Q output of flip-flop 214 is connected to one input of a NAND gate 218, the other input of which is connected to the Q output of delayed index mode flip-flop 200. With this latter connection, the output of the NAND gate 218, in the nondelayed mode of operation of the hard sectoring logic circuit 22, will always be high and and such high level is transmitted on the conducting path 154 to the enable terminal of the second counter so that all accumulator clock pulses received by the second counter following a master reset or a partial reset will always be counted. In the delayed mode of operation, the input of the NAND gate connected to flip-flop 200 will always be high so that the conducting path 154 to the second counter will be driven low by either a master or a partial reset to disable the second counter and cause the accumulator to equal the delayed index time at the time that the first accumulator clock pulse is received thereby. The trailing edge of the same accumulator clock pulse will reset flip-flop 214, to drive conducting path 154 high and thereby enable the second counter to count subsequent accumulator clock pulses and enable normal accumulator action until the next master or partial reset occurs. Thus, the operation of the flip-flop 214 and gate 218 is to suppress counting by the second counter 150 of the first accumulator clock pulse in the delayed index mode of operation following a master or partial reset to prevent counts associated with the delayed index skew distances 62 and 64 from being entered in the second counter 150. As shown, in FIG. 3, the conducting path 136, used to select the time to be entered into the accumulator 112, is connected to the conducting path 154 so that, while counting by the second counter 150 is suppressed, the accumulation time selector 130 will select the delay time in the latch 124 for entry into the accumulator 112. This causes the accumulator to account for the delayed index skew distance.

Figure 11:
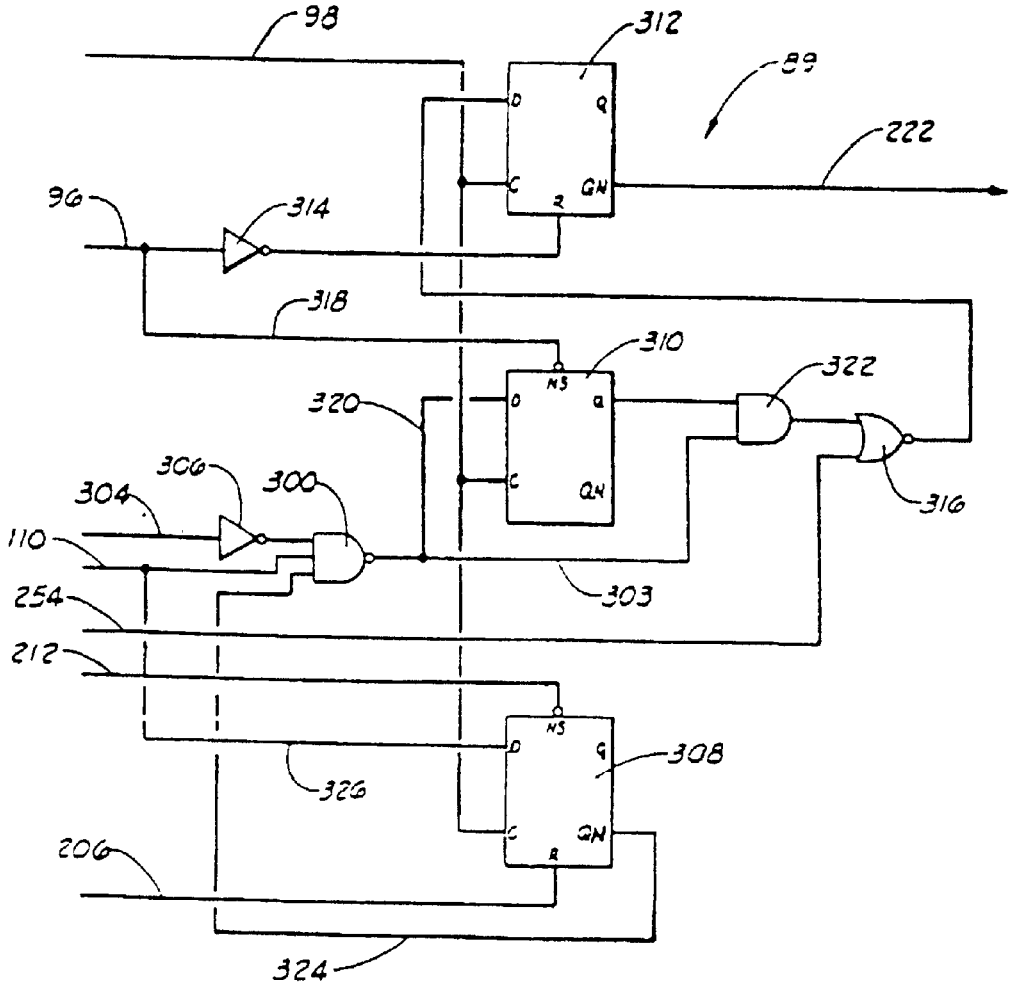
FIG. 11 is a circuit diagram for a raw sector pulse generator of the hard sectoring logic circuit.
Figure 9:
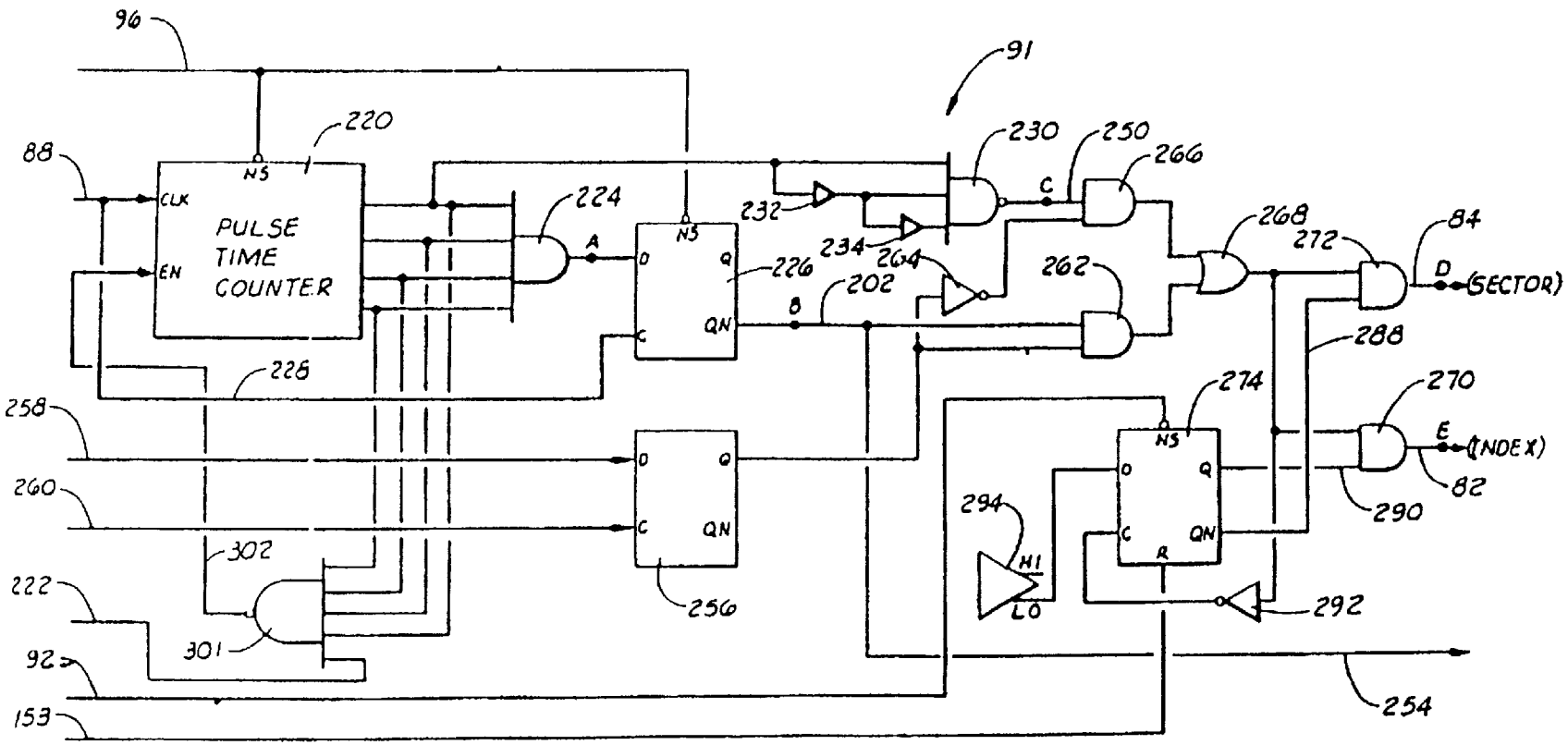
FIG. 9 is a circuit diagram for an index-sector pulse generator of the hard sectoring logic circuit.

Coming now to the sector location pulse generator which, as noted above, is comprised of the raw sector pulse generator 89, shown in FIG. 11, and the index-sector pulse generator 91, shown in FIG. 9, it will be useful to first consider the structure and operation of the index-sector pulse generator 91. Such circuit is a substantially self-contained unit that generates the index and sector pulses in response to raw sector pulses generated by the raw sector pulse generator 89 whose operation is intimately associated with remaining portions of the hard sectoring logic circuit 22 and acts as a go-between to the index-sector pulse generator 91. After discussion of the structure and operation of the index-sector pulse generator, the structure of the raw sector pulse generator 89 will be described and the operation described in relation to remaining portions of the circuit 22.

Referring to FIG. 9, the index-sector pulse generator 91 is comprised of a pulse time counter 220 that is a conventional up counter having a clock input connected, via the conducting path 88 in FIG. 1, to the zone clock used by the read/write controller 76 in transferring data from the buffer 74 to the disk 26. Thus, the operation of the index-sector pulse generator 91 is synchronized with the operation of the read/write controller 76, rather than with remaining portions of the hard sectoring logic circuit 22, so that the delivery of the sector location pulses is coordinated with the transfer of data to the disk. The connection of the pulse time counter 220 to the remainder of the hard sectoring logic circuit 22 is via an enable terminal that responds to negative raw sector pulses on a conducting path 222 (see also FIG. 11) to provide index and sector pulses, having selectable durations in zone clock periods, to the read/write controller 76 in a manner to be described below.

The counter 220 has four output terminals, for counting from a binary zero to a binary fifteen. These terminals are connected to four inputs of an AND gate 224 that is thus enabled when counting is complete and all counter 220 outputs are high. The output of the AND gate 224 is connected to the D input of a type D flip-flop 226 which is clocked by zone clock pulses received on the conducting path 88 and a conducting path 228 therefrom. Both the counter 220 and the flip-flop 226 have active low set terminals that receive negative combined reset pulses from the AND gate 94 via the conducting path 96 every time a master or partial reset occurs.

The outputs of the counter 220 are also connected to the inputs of a NAND gate 301, which receives the raw sector pulses at an additional input and the output of NAND gate 301 is connected via conductor 302 to the enable terminal of the counter 220. Thus, at the end of a count up to a binary fifteen and in the absence of a negative raw sector pulse on conducting path 222, the output of NAND gate 301 will be low and the counter 220 will be disabled. Enablement of the counter 220 will thus occur with the reception of the raw sector pulse which causes the counter output to become zero on the first zone clock pulse and then count to a binary fifteen with the enablement thereof being maintained by low voltages appearing at the outputs of the counter while counting occurs. The counter 220 is then disabled while awaiting the next raw sector pulse.

The most significant bit of the number appearing at the output terminals of the counter 220 is connected to the inputs of a three input NAND gate 230, directly for one input and via serially connected pulse stretches 232 and 234 for the remaining two inputs. As will become clear below, short duration sector location pulses, eight zone clock periods in length, are provided via the NAND gate 230 and, as is known in the art, polling at a one byte rate is commonly utilized by read/write controllers to pick up sector location pulses. The use of the pulse stretchers 232 and 234 insures that the cycle time for the NAND gate 230, that is the time between a drop of the most significant bit of the counter 220 to zero and and its subsequent rise at the end of a countdown will exceed eight zone clock periods by an amount sufficient for the read/write controller to detect all sector location pulses.

From the above, it can be seen that in the normal state of the index-sector pulse generator 91; that is, while "disabled" due to no raw sector pulse input at the conducting path 222, all counter outputs are allowed to count up to all high. At this point, as will be discussed below, the raw sector input is also high causing the output of gate 301 to go low and disable counter 220. The output of the NAND gate 230 will, at this time, go low. During the count up by the counter 220, the QN output of the flip-flop 226 is utilized to generate 15 bit long duration sector location pulses so that, in the normal state of the index-sector pulse generator 91, both the NAND gate 230 and the flip-flop 226 will provide a low voltage to components that, as will be discussed below, provide the sector location pulses to the controller 76.

Figure 10:
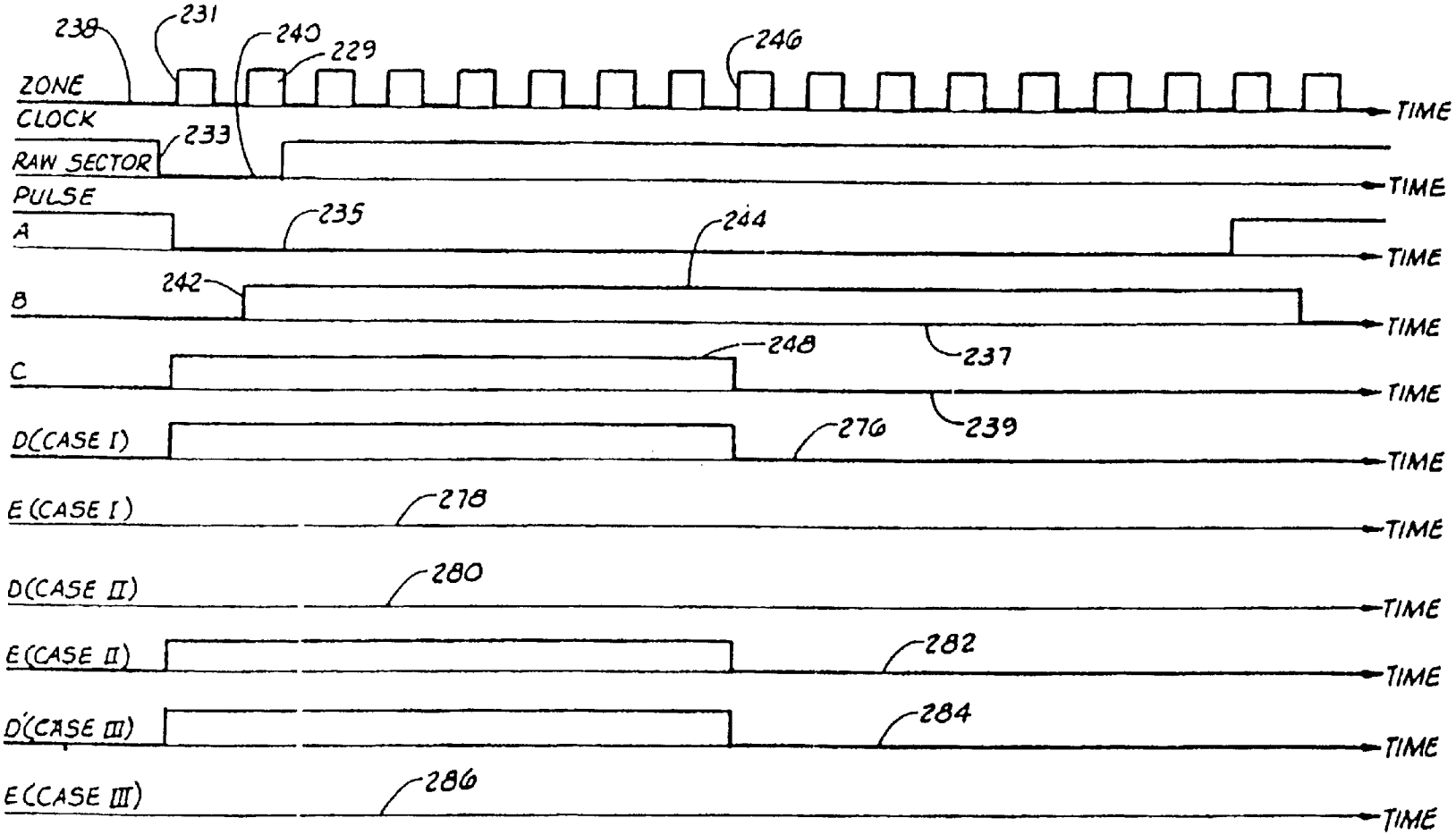
FIG. 10 is a timing diagram for the index-sector pulse generator.

It will be useful at this point to consider the operation of the above-described portion of the index-sector pulse generator 91 before continuing with the remaining structure and, for this purpose, selected points of the circuit have been identified with the letters A, B, and C corresponding to time axes 235, 237 and 239 in FIG. 10. In particular, time axis 235 (point A) illustrates the signal at the output of AND gate 224, time axis 237 (point B) illustrates the signal at the QN output of flip-flip 226 and time axis 237 (point C) illustrates the signal at the NAND gate 230 output following reception of a negative raw sector pulse by the counter 220.

As noted above, the index-sector pulse generator 91 is clocked by the zone clock and will, accordingly, be asynchronous with the remainder of the hard sectoring logic circuit 22 so that, as indicated on time lines 238 and 240, the raw sector pulse will not necessarily coincide in time with a zone clock pulse. However, as will be discussed below, provision is made in the raw sector pulse generator to insure that the raw sector pulse will be of a duration that will be long enough to include one rising edge of a zone clock pulse. Accordingly, during the rise of the first zone clock pulse, as at 231, following the leading edge 233 of a raw sector pulse, the output of counter 220 will be clocked to zero and, subsequently, countup of the counter 220 will occur. At this time, the output of the AND gate 224 will drop to zero so that the D input of the flip-flop 226 will also drop. As a result, the Q output of flip-flop 226 will be clocked low at the rise of the next zone clock pulse 229 to provide an upgoing signal at the QN output thereof as indicated at 242 in FIG. 10. Since the AND gate 224 will remain disabled for the remainder of the up count, as shown for the point A on the time axis 235, point B will remain high as indicated at 244 on the time axis 237, for the remainder of the count; that is, for fifteen zone clock periods. However, the output of the NAND gate 230 (point C) will go active high immediately after the first zone clock pulse 231 following reception of the raw sector pulse and remain high for slightly over 8 zone clocks, as shown at 248, until slightly after the rise of the ninth zone clock pulse, at 246, following reception of the raw sector pulse, as shown on time axis 239. This results because of the control of this gate solely by the most significant bit of the number in the counter 220. Thus, the operation of the counter 220, flip-flop 226 and gates 224 and 230 is to provide a positive pulse on the conducting paths 250 and 252 for eight and fifteen zone clock periods respectively. It will be noted that the voltage level at the QN output of flip-flop 226 is delivered to the raw sector pulse generator on conducting path 254 (FIGS. 9 and 11) to terminate the raw sector pulse in a manner to be discussed below.

Returning to FIG. 9, the selection of the duration of the index and sector pulses is effected by a type D flip-flop 256 having a D input terminal connected to one line, indicated at 258, of the microcomputer data bus and a clock input terminal that receives an enable signal from the microcomputer on a conducting path 260. The Q output of the flip-flop 256 is connected directly to one input of an AND gate 262, which receives the long duration pulse from the flip-flop 226 and, via an inverter 264, to one input of an AND gate 266 which receives the short duration pulse from the NAND gate 230. Thus, sector and index pulses to be transmitted to the controller 76 can be caused to have either long or short durations by placing the appropriate byte on the computer data bus 56 and transmitting a clock signal from the microcomputer 54 to the flip-flop 256.

The outputs of the AND gates 262 and 266 are connected to the inputs of an OR gate 268 so that a positive pulse of the selected duration will occur at the output of the OR gate 268 each time a raw sector pulse is transmitted to the index-sector pulse generator 91. This pulse will be delivered to the read/write controller as either an index pulse, via an AND gate 270 (point D on FIG. 9), or a sector pulse, via an AND gate 272 (point E on FIG. 9), as will now be described with reference to FIGS. 9 and 10.

The selection of the pulse as an index or sector pulse is effected by a type D flip-flop 274 having an active low set terminal that receives the negative master reset pulses on the conducting path 92 and an active high reset terminal that receives the positive pulse complements of the partial reset pulses on the conducting path 153. Three cases of operation occur as indicated on time axes 276 and 278 (case I), time axes 280 and 282 (case II), and time axes 284 and 286 (case III). These cases have been illustrated for short duration pulses in FIG. 10. As will be clear to those skilled in the art, the cases will occur identically for long duration pulses; merely the durations of the sector location pulses will be changed.

In case I, the case that occurs most commonly, the Q output of flip-flop 274 will have been clocked low by a previous sector location pulse, as will be discussed below, and the QN output will be high. Thus, in response to a raw sector pulse that will enable OR gate 268, AND gate 272 will be enabled, via conducting path 288 to the high QN output of flip-flop 274. Thus, the AND gate 272 will pass the positive pulse from OR gate 268 to the conducting path 84, as shown on time axis 276, as a sector pulse. Concurrently, the AND gate 270 will block transmission of an index pulse as indicated on time axis 278.

Following a master reset, case II will occur. In this case, the negative master reset pulse, which is received at the active low set terminal of the flip-flop 274 will set such flip-flop so that the output of gate 270 will become active high via conducting path 290 to give rise to an index pulse as indicated on time axis 282 while the gate 272 will be disabled via conducting path 288 to suppress the generation of a sector pulse as indicated on time axis 280.

Subsequent to this index pulse, the Q output of flip-flop 274 will be clocked low to return the operation to case I operation as will now be described. As shown in FIG. 9, the output of OR gate 268 is connected via an inverter 292 to the clock input of flip-flop 274 so that, at the completion of the index pulse, the clock terminal of the flip-flop 274 will go high. The low output of a pull-down 294 is connected to the D input of the flip-flop 274 so that, at the trailing edge of the index pulse, the Q output flip-flop 274 will be clocked low to return to the case I operation.

The third case occurs after a partial reset. The active high reset terminal of the flip-flop 274 receives the partial reset positive pulse complement on the conducting path 153 so that, except in the case that such complement is suppressed by a master reset as discussed above, the flip-flop 274 will be reset to cause operation that is identical to case I operation as shown by the pulse on time axis 284 and the lack thereof on time axis 286. Should a master and partial reset occur at the same time, the partial reset complement is suppressed and operation occurs in the manner described above for case II.

Referring now to FIG. 11, the raw sector pulse generator 89 is comprised of a three input NAND gate 300 which, to facilitate discussion of the operation of the hard sectoring logic circuit 22, will be referred to herein as a sector location pulse gate. One input of the sector location pulse gate 300 is connected to the conducting path 110 leading to the output of the first comparator 108 so that the output of the gate 300, on a conducting path 303, becomes active low in response to the high electrical signal that will appear at the output of the first comparator when the time from index contents of the first counter 102 equal or exceed the contents of the next sector time accumulator 112. For such enablement to occur, the output of the second comparator, which is connected to a second input of the gate 300 via a conducting path 304 (see also FIG. 3) and an inverter 306, must be low and the third input to the gate must be high as will be discussed below.

In addition to the sector location pulse gate 300, the raw sector pulse generator is comprised of three type D flip flops having clock terminals connected to the conducting path 98 on which appears phase one of the master clock. To facilitate the discussion of the operation of the circuit 22, these flip-flops will be referred to as the delayed index flip-flop 308, the pulse stretcher flip-flop 310, and the raw sector flip-flop 312.

The QN output of the index delay flip-flop 308 is connected to the third input terminal of the sector location pulse gate 300 via a conducting path 324 to disable the gate 300 at such times that the index delay flip-flop 308 is set and thereby prevent the generation of a raw sector pulse and, accordingly, a sector location pulse as will be discussed below. Such disablement is effected by a partial reset pulse or in the nondelayed index mode. Such delayed index mode of operation by the connection of an active low set terminal of the flip-flop 308 to the mask first sector output of NOR gate 210 (FIG. 8) of the delayed index controller 138 via the conducting path 212. As discussed above, both a master reset pulse and a partial reset pulse are transmitted by the NOR gate 210 in the delayed index mode of operation of the circuit 22. The NOR gate 210 will only transmit a partial reset pulse via the conducting path 212 when in the nondelayed index mode. Such setting of the index delay flip-flop 308 occurs to prevent generation of sector location pulses until the QN output of the index delay flip-flop has clocked high. Such clocking occurs at the first phase one master clock pulse that occurs after the output of the first comparator has gone low in response to a time from index count in the first counter 102 that exceeds the next sector time in the accumulator 112. To this end, the D input of the flip-flop 308 is connected to the output of the first comparator 108 via the conducting path 110 and a conducting path 326. Thus, the function of the index delay flip-flop 308 is to suppress generation of a sector location pulse until the first inactive low output of the first comparator following either a master reset in the delayed index mode or a partial reset. In the nondelayed index mode, corresponding to commencement of sectors at the index location, the index delay flip-flop 308 is reset, via the master reset pulse transmitted on conducting path 206 by the delayed index controller shown in FIG. 8. This permits normal enablement of the gate 300 by even the first active high output received from the first comparator 108, as will be described below.

As its name implies, the raw sector flip-flop 312 provides the negative raw sector pulse to the sector location pulse generator 91 via the conducting path 222 that is connected between the QN output of the flip-flop 312 and one input of NAND gate 301 of FIG. 9. The active high reset terminal of the raw sector pulse flip-flop 312 is connected, via an inverter 314 and the conducting path 96, to the AND gate 94 that delivers both the master and partial reset pulses. Thus, the raw sector pulse flip-flop 312 is reset at the leading; that is, falling edge of either of these negative pulses.

The D input of the raw sector flip-flop 312 is connected to the output of a NOR gate 316 so that an active high signal at the output of the NOR gate 316 at the time the first phase of the master clock rises will clock the QN output of the raw sector flip-flop 312 low to initiate transmission of a negative pulse to the index-sector pulse generator 91 and initiate the count sequence of the pulse time counter 220 as discussed above. As noted above, the voltage level at the QN output of the flip flop 226 (FIG. 9), which becomes high as the count sequence of the sector location pulse commences, is transmitted to the raw sector pulse generator 89 via the conducting path 254 to terminate the raw sector pulse. One input of the gate 316 receives the signal on the conducting path 254 so that any phase one master clock pulse delivered after the QN output of the flip-flop 226 has been clocked high will cause the output of the NOR gate 316 to become low and terminate the raw sector pulse by clocking the QN output of flip-flop 312 high.

The pulse stretcher flip-flop 310 has an active low set terminal that is connected to the output of AND gate 94 (FIG. 3) via the conducting path 96 and a conducting path 318 so that the pulse stretcher flip-flop 310 is set during either a master reset or a partial reset. The D input of the pulse stretcher flip-flop 310 is connected to the inverting output of the sector location pulse gate 300 via a conducting path 320 so that the Q output of the pulse stretcher flip-flop 310 will be clocked low by a master clock signal at such times that the output of the gate 300 is active low. The Q output of the pulse stretcher flip-flop 310 is connected to one input of an AND gate 322, the other input of which receives the output of the sector location pulse gate 300 on a conducting path 303. Once the output of the sector location pulse gate 300 is active low, the output of the AND gate 322 will be low. The low output of the AND gate 322 is provided to the second input of NOR gate 316 to cause the output of such NOR gate to become active high upon enablement of the sector location pulse gate 300 and initiate the generation of the raw sector pulse at the next phase one clock pulse. Because the Q output of the pulse stretcher flip-flop 310 will be clocked low at the same next phase one clock pulse, the output of AND gate 322 will remain active low for one extra phase one clock period. This will cause the QN output of the raw sector flip-flop 312 to continue active low for one extra master clock pulse unless sooner terminated by reception by the NOR gate 316 of a positive signal on the conducting path 254 caused by initiation of a count down in the counter 220 of the index-sector pulse generator 91. This feature of the hard sectoring logic circuit, provided by the pulse stretcher flip-flop 310, insures that the sector location pulse will be generated at such times that the zone clock frequency is lower than the master clock frequency used in the operation of the hard sectoring logic circuit 22.

OPERATION

Figure 12:
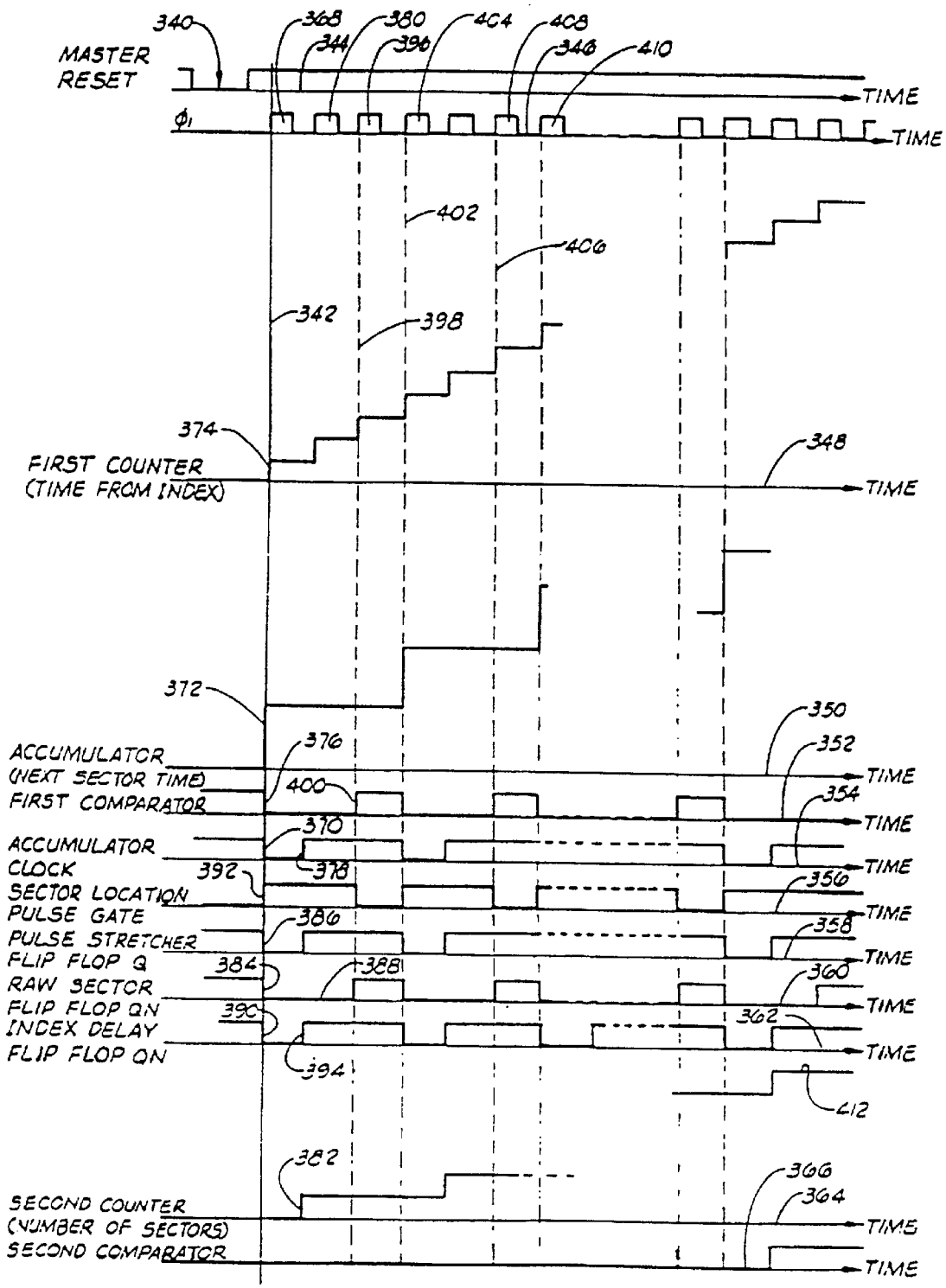
FIG. 12 is a timing diagram for one mode of operation of the hard sectoring logic circuit.

FIG. 12 is a timing diagram that illustrates the operation of the hard sectoring logic circuit 22 in the nondelayed mode of operation following a negative master reset pulse 340 on time axis 344 that occurs each time the index 62 on the disk 26 passes the transducer head 36. For purposes of discussion, it will be considered that the transducer head 36 has previously been moved to a selected track on the disk. The microcomputer 54 is programmed to enter control data used in the operation of the circuit 22 into appropriate components thereof concurrently with the partial reset that accompanies a move to a new track so that, for the times shown in FIG. 12, sector and delay times will have been previously entered into the latches 122 and 124, the number of sectors for the track will have been previously entered into latch 144, the QN output of flip-flop 200 (FIG. 8) will have previously been clocked high to select the nondelayed mode of operation, and the duration of the sector and index pulses will have been selected by placing the appropriate voltage level on the conducting path 258 (FIG. 9) leading to the D input of the flip-flop 256 while a pulse is delivered to the clock input of such flip-flop.

Referring to FIG. 3, the master reset pulse is delivered to inverting reset terminals of the first counter 102 and the accumulator 112 so that, with the leading edge of the master reset signal, both the first counter 102 and the accumulator 112 will be reset causing the output of the first comparator to go high as shown to the left of the line 342 that indicates the leading edge of the first phase 1 clock pulse to occur after the master reset. Further, the master reset signal will be delivered, as a combined reset from AND gate 94, on conducting path 155 to the inverting reset terminal of second counter 150. Thus, in view of the previous entry of a number of sectors into the number of sectors latch 144, the output of the second comparator 148 will be low. Finally, as shown in FIG. 3, the complement of the master reset pulse will be delivered to the reset terminal of the flip-flop 170 of the accumulator clock 118 so that the QN output of the flip-flop 170, also referred to herein as the accumulator clock output, will be high.

Referring to FIG. 11, the combined reset signal delivered on conducting path 96 by the AND gate 94 in response to every master reset signal, as discussed above with respect to FIG. 6, resets the raw sector flip-flop 312 and sets the pulse stretcher flip-flop 310 so that, following the master reset, the QN output of flip-flop 312 will be high and the Q output of flip-flop 310 will be high. Further, and with additional reference to FIG. 8, the prior clocking of the QN output of flip-flop 200 high will cause the Q output thereof to be low so that the output of the NOR gate 202 will go high when the negative master reset signal is received on conducting path 92. Thus, the index delay flip-flop 308 will be reset by the master reset signal so that the QN output thereof will be high following the master reset. The state of the circuit 22 just prior to the generation of the first phase one clock pulse on time axis 346 following the master reset is thus shown to the left of the line 342 in FIG. 12 as follows:

(1) The contents of the first counter 102 will be zero (Time axis 348);

(2) The contents of the accumulator 112 will be zero (Time axis 350);

(3) The output of the first comparator 108 will be high (Time axis 352);

(4) The accumulator clock output (QN of flip-flop 170) will be high (Time axis 354);

(5) The sector location pulse gate 300 output will be low (Time axis 356);

(6) The Q output of the pulse stretcher flip-flop 310 will be low (Time axis 358);

(7) The QN output of the raw sector flip-flop 312 will be high (Time axis 360);

(8) The QN output of the index delay flip-flop 308 will be high (Time axis 362);

(9) The output of the second counter 150 will be zero (time axis 364); and

(10) The output of the second comparator 148 will be low (Time axis 366).

At the time the first phase one clock pulse 368 rises, the high state of the output of the first comparator 108 and the low state of the Q output of the flip-flop 170 causes the output of the NOR gate 173 to be high. Accordingly, in the Q output of the flip-flop 170 will be clocked high and the QN output thereof; that is, the accumulator clock, will be clocked low as at 370. Thus, the time for a sector is clocked into the accumulator 112, as at 372 via the connection of the clock input of the accumulator 112 to the accumulator clock 118 and the connection of the accumulator data input to the accumulation time selector 130. (In the nondelayed mode of operation, the Q output of the flip-flop 200 in FIG. 8 will have been clocked low as noted above so that the output of the NAND gate 218, appearing on conducting path 136, will be high to provide, via the inverter 134 in FIG. 3, a low signal to the accumulator time selector 130 to cause selection of a sector time to be presented to the accumulator 112.) Concurrently, a count of only one will be clocked into the first counter 102 as at 374, with the result that the output of the first comparator 108 will go low as at 376 and remain low until the first counter has counted a number of phase one clock pulses equal to the number of bits in a sector of data. (For purposes of illustration, FIG. 12 has been drawn as if such number of bits is three. As will be recognized by those skilled in the art, the number of bits stored in a sector on a disk of a hard disk drive is of the order of several thousand.) With the drop in the output of the first comparator, the output of the NOR gate 173 in FIG. 3 will go low so that the accumulator clock output, at the QN output of flip-flop 170, will be clocked back high, as at 378, at the rise of the next phase one clock pulse 380.

With the return of the accumulator clock output to a high level, such level being transmitted to the clock input of the second counter 150 on conducting path 151, a count of one, to count the first sector on the disk, will be entered into the second counter 150 as at 382. Since this count is being compared with the number of sectors in the number of sectors latch 144, the output of the second comparator 148 will remain low.

Returning to the master reset pulse 340 and referring to FIGS. 9 and 11, such pulse, on conducting path 96 will set the flip flop 226 so that, as the phase one clock pulse 368 rises, the QN output of flip-flop 226 will be low and the input of NOR gate 316 connected thereto via conducting path 254 will be low. Further, the low output state of the sector location pulse gate 300 will disable AND gate 322 so that, as the pulse 368 rises, the output of the NOR gate 316 will be high. Thus, the pulse 368 clocks the Q output of the raw sector flip-flop 312 high to drop the QN output thereof, as at 384, and initiate the countdown of an index pulse as described above with reference to FIG. 9 upon reception of a zone clock pulse by the pulse time counter 220. It will be noted that, until the second zone clock pulse arises, the conducting path 254 to NOR gate 316 will remain low with the result that, so long as AND gate 322 remains disabled, the raw sector pulse generator QN output will be repeatedly clocked low to, in effect, stretch the negative raw sector pulse supplied thereby on conducting path 22 to the index-sector pulse generator 91 shown in FIG. 9. This feature, afforded in part by the pulse stretcher flip-flop 310 as will be described below, insures that every raw sector pulse will result in either an index or sector pulse being delivered to the read/write controller 76 even though the zone clock frequency may be lower than the frequency of the phase one clock. In general, the zone clock frequency will be of the same order of magnitude as the phase one clock so that a doubling of the duration of the raw sector pulse will suffice. Such doubling is effected by the pulse stretcher flip-flop 310 in the following manner.

At the time that the phase one clock pulse 368 rises, the output of the sector location pulse gate 300 will be low so that the Q output terminal of the pulse stretcher flip-flop 310 will be clocked low, as at 386, to prevent AND gate 322 from being enabled at the rise of the phase one 380. Thus, if no zone clock pulses have been received by the index-sector pulse generator circuit 91 prior to the rise of the pulse 380, so that the QN output of the flip-flop 226 in FIG. 9 has remained low, the output of NOR gate 316 will be high at the rise of the pulse 380 to, in effect, renew the clocking of the QN output of the raw sector flip-flop 312 to a low state constituting a raw index signal. Thus, in the absence of a zone clock pulse between the rise of the first phase one clock pulse 368 and the rise of the second, the QN output of the raw sector flip-flop 312 will remain low for two phase one clock pulses as has been shown at 388 in FIG. 12.

Finally, at the rise of the clock pulse 368, the output of the first comparator 108 will be high and such output is transmitted to the D input of the index delay flip-flop 308 to cause clocking of the QN output thereof low as at 390. The result is that the sector location pulse gate 300 output becomes high, as at 392, and remains high for the duration of the first phase one clock pulse 368. At the time the second phase one clock pulse 380 rises, the output of the first comparator will already be low so that the QN output of the index delay flip flop will again be clocked high, as at 394, but such clocking will not effect the output state of the sector location pulse gate 300. In particular, since the output of the first comparator 108 will remain low while the first counter 102 counts up to the first sector time that has been entered in the accumulator 112, the output of the sector location pulse gate 300 will remain high to prevent further raw sector pulses from being generated by the raw sector flip-flop 312 until the next sector location time.

Thus, the state of the circuit 22 just prior to the phase one clock pulse, indicated at 396, that clocks the counter 102 to a number equal to the sector time that has been entered into the accumulator 112 differs from the state of the circuit 22 just prior to the rise of the clock pulse 368 in only the following ways:

(1) the accumulator 112 will contain a value equal to a sector time;

(2) the first counter 102 will contain a value that is one less than a sector time;

(3) The second counter 150 will contain a count of one for the first sector which is being counted;

(4) the QN output of the flip-flop 274 in FIG. 9 will have been clocked high so that all further raw sector pulses will give rise to sector pulses transmitted to the controller 76 on conducting path 84;

(5) the output of the first comparator 108 will be low; and (6) the output of the sector location pulse gate 300 will be high.

(As shown in FIG. 12, the QN output of raw sector flip-flop is low just prior to the rise of the clock pulse 396. This is an artifact of the use of only three phase one clock cycles for each sector time in order to illustrate the coaction of the first counter 102 and accumulator 112. In a practical hard disk drive, the number of phase one clock cycles corresponding to one sector on the disk 26 will, as has been noted, be of the order of several thousand. Accordingly, the QN output of the raw sector flip-flop will have returned to a high state by the time the first counter contents have reached a value near the contents of the accumulator 112.) Thus, [is] *in* so far as the operation of the circuit 22 is concerned, the state of the circuit just prior to the time indicated by the line 398 differs from the state of the circuit just prior to the time indicated by the line 342 only in that the output of the first comparator 108 is low, rather than high, and the output of the sector location pulse gate 300 output is high, rather than low. With the rise of the pulse 396, the contents of the first counter 102 rises to that of the accumulator 112 so that the output of the first comparator 108 will go high, as at 400, to cause the output of the sector location pulse gate 300 to go low. Thus, following the rise of the clock pulse 396, the circuit 22 will have returned to the state prior to the rise of the first clock pulse 368 following a master reset except for a completed counting and accumulation of the first sector time in the first counter and accumulator respectively, a completed counting of such first sector by the second counter and the transition of the index-sector pulse generator 91 to deliver a sector, rather than an index, pulse to the read/write controller 76. Thus, in so far as the operation of the circuit 22 is concerned, the state of the circuit 22 at the line 402 is the same as the state at the line 342 drawn for the rise of the first phase one clock pulse 368 following the master reset. The result is that the rise of the phase one clock pulse 404 at the line 402 will cause the same chain of events that were caused by the rise of the initial phase one clock pulse 368 except for the generation of a sector, rather than an index, pulse. Thus, the accumulator 112 will accumulate another sector time, corresponding the second cycle of operation initiated by the pulse 404 and the second counter 150 will enter a two that is indicative of this second cycle of operation. Since the same events occur for the pulse 404 that occurred for the pulse 368, the circuit 22 will end up in a state, at a time indicated by the line 406, that corresponds to the state at the time indicated by line 398. Thus, the rise of the clock pulse 408 at the line 406 will again place the circuit in a state comparable to the initial so that the cycle will again be repeated with the rise of the succeeding clock pulse 410. With this cycle, the accumulator 112 accumulates another sector time and the second counter is incremented to again indicate the sector on the disk 26 that is being counted out by the first counter 102. Thus, each time a sector passes under the transducer head 36, the time from index to the completion of the next sector is entered into the accumulator 112 and the second counter is incremented to the number of such sector from the index line 62.

Such operation continues until the contents of the second counter reaches the number of sectors indicated at 412 in FIG. 12; that is, until all sectors for the track being followed have been counted. With the rise of the second counter contents to the value so indicated, such contents will equal the contents of the number of sector latch 144 so that the output of the second comparator 148 will go high and remain high until a succeeding master reset pulse is received at the reset terminal thereof. Thus, the output of the inverter 306 (FIG. 11) that receives the second comparator output on conducting path 304 will go low to prevent further drops of the output of the sector location pulse gate 300 that trigger the generation of raw sector and, consequently, index and sector pulses.

Figure 13:
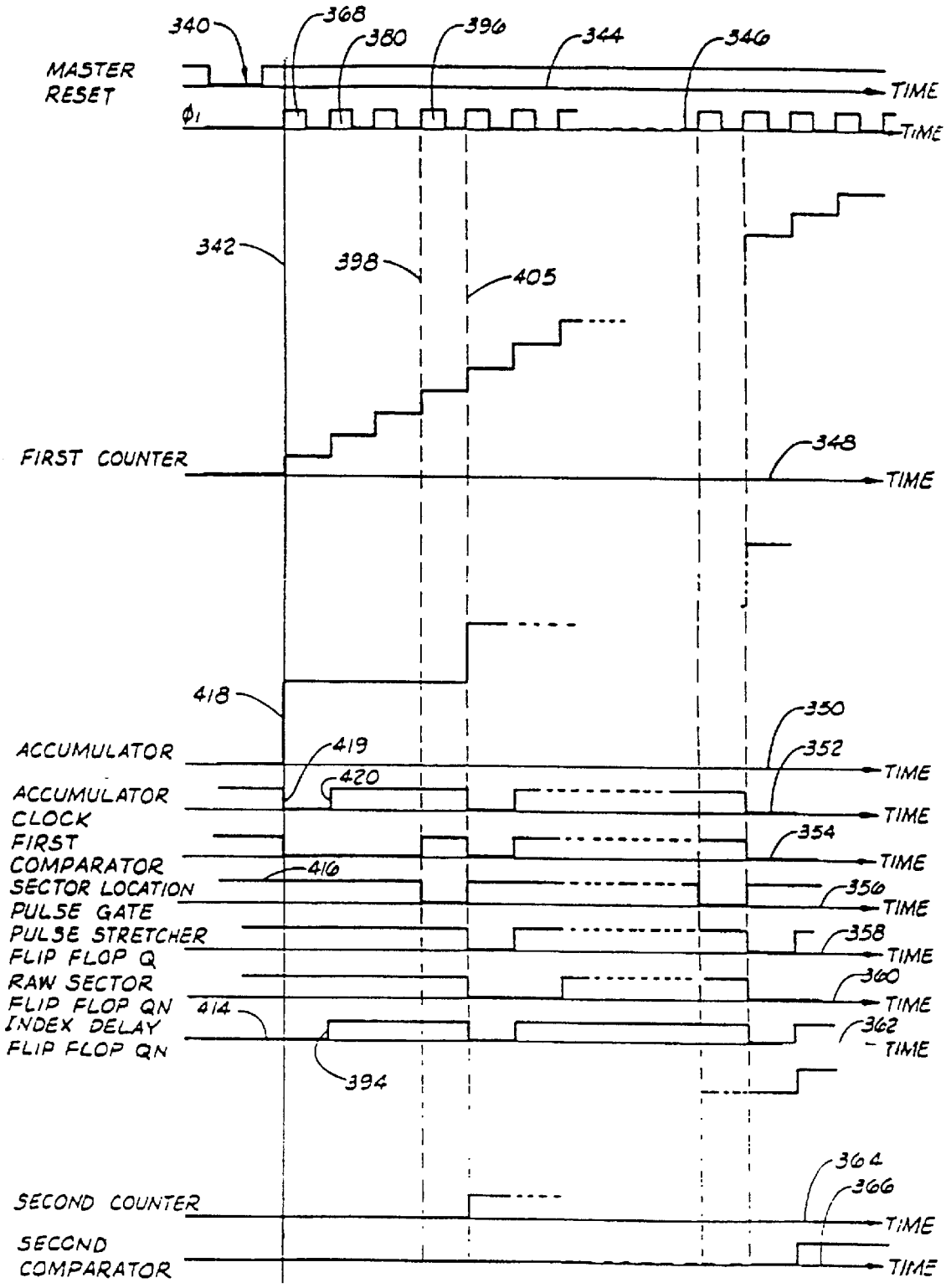
FIG. 13 is a timing diagram for a second mode of operation of the hard sectoring logic circuit.

FIG. 13 illustrates the operation of the circuit 22 following a master reset in the delayed index mode of operation. Such operation can best be understood by comparison with the nondelayed index mode of operation and the numbering of the features of the graphs in FIG. 13 has been selected to facilitate such comparison. Thus, the master reset pulse shown in FIG. 13 has been numbered 340 as in FIG. 12, phase one clock pulses corresponding to clock pulses in FIG. 12 have been given the same numerical designations as in FIG. 12, the axes have been identically numbered and vertical lines corresponding to leading edges of selected clock pulses have been numbered as in FIG. 12. (It will be noted that the line 398 and pulse 396 in FIG. 13 are shifted one clock cycle to the right from the corresponding line 398 and pulse 396 in FIG. 12. Such shift is to preserve the functional correspondence between such lines and pulses.)

Referring first to FIGS. 8 and 11, the selection of the delayed index mode is effected by clocking the QN output of the flip-flop 200 low. To this end the microcomputer 54 outputs a logical high on line 140 leading to the D input of flip-flop 200 and delivers a clock pulse to the C input thereof on conducting path 142. Thus, with the reception of the master reset pulse on conducting path 92, the output of NOR gate 204 will go high to cause the output of NOR gate 210 to go low. The output of the gate 210 is connected to the active low set terminal of the index delay flip-flop 308 (FIG. 11) via conducting path 212 so that the flip-flop 308 will be set by the master reset pulse 340. (The high Q output of flip-flop 200 forces gate 202 permanently low in the delayed index mode to prevent any reset of the index delay flip-flop 308.) Thus, the QN output of the index delay flip-flop 308 will be low as at 414, rather than high as in the nondelayed index mode, at the time the clock pulse 368 rises. Such state for the QN output of the index delay causes the output of the sector location pulse gate 300 to be high as at 416, rather than low as in the nondelayed index mode.

Further, the Q output of the flip-flop 200 will be high so that setting of the flip-flop 214 by reception of the master reset signal at the active low set terminal thereof will cause the output of NAND gate 218 to go low. Such output is provided to the enable terminal of the second counter 150 on conducting path 154 to disable counting thereby and the inverter 134, on conducting path 136, that is connected to the select terminal of the accumulation time selector 130 and causes such selector to transmit the output of the delay time latch 124, rather than the sector time latch 122, to the inputs of the accumulator 112.

Returning now to FIGS. 11 and 13, the effect of the output sector location pulse gate 300 output being held high by the index delay flip flop 308 will be that both the Q output of the pulse stretcher flip-flop 310 and the QN output of the raw sector flip-flop 312 will remain high in response to first clock pulse 368 to follow the master reset. Specifically, the high level at the output of the sector location pulse gate 300 will be clocked into the Q output of the flip-flop 310 and will further result in enablement of the AND gate 322 so that a logical low will be at the D input of flip-flop 312 with the rise of the clock pulse 368. Thus, the high output of the sector location pulse gate 300 at the rise of the clock pulse 368 will suppress the generation of a raw sector pulse by the flip-flop 312 and, consequently, suppress the generation of an index or sector pulse by the index-sector pulse generator 91 that is normal in the nondelay index mode.

However, the operation of the accumulator clock 118 is not affected by the state of the sector location pulse gate 300 so that a time will be accumulated in the accumulator 112 as in the nondelayed mode of operation. Such time will be the delay time because of the signal transmitted to the accumulation time selector 130 from the inverter 134. Thus, the delay time for the track being followed will be entered in the accumulator 112, at 418 in place of the entry of the sector time indicated at 372 in FIG. 12. Concurrently a single count will be entered in the first counter 102 so that the output of the first comparator will go low at 419 as in the nondelayed mode of operation of the circuit 22. It will be noted that the entry of the delay time into the accumulator 112 will not be counted by the second counter 150 because of the disablement of such counter noted above.

Thus, the overall response of the circuit 22 to the first clock pulse 368 following the master reset is the entry of the delay time into the accumulator 112 but no counting of such time as a sector time and no emission of an index or sector pulse to the read/write controller 76.

With a low output for the first comparator, the rise of the second phase one clock pulse 380 will clock the QN output of the index delay flip flop 308 high in exactly the same manner that such clocking occurs in the nondelayed mode of operation of the circuit 22. The result is that the disablement of the sector location pulse gate 300 caused by the reset of the index delay flip-flop 308 is removed so that the gate 300 will now operate in the same manner as in the nondelayed mode of operation. Accordingly, subsequent transitions of the first comparator output to a high state will give rise to raw sector pulses and, consequently, index and sector pulses as described above for the nondelayed mode of operation.

Returning to FIG. 8, the accumulator clock pulse on the conducting path 120 is transmitted to the clock input of the flip-flop 214 and the D input of such flip-flop is connected to the pull-down 216 so that, with the trailing; that is, rising, edge of the accumulator clock pulse generated in response to the second phase one clock pulse 380, as at 420, will clock the Q output of flip flop 214 low to cause the output of the NAND gate 218 to go high. The result is that the second counter 150 is now enabled via the conducting path 154 and the accumulation time selector is placed in a state to transmit the sector time, rather than the delay time, to the accumulator 112. Thus, with the rise of the clock pulse 396, at which the contents of the first counter 102 reaches the delay time, the circuit 22 assumes a state nearly identical to the nondelay mode state after the master reset pulse 340 in FIG. 12. At the next phase one clock pulse at vertical line 405, the circuit 22 then commences to operate in the same manner that the circuit operates beginning with the first clock pulse 368 in the nondelayed mode of operation as seen in FIG. 12 beginning at vertical line 342. Thus, the circuit 22 will provide the desired delay time without counting such time as a sector and without generating index or sector pulses and will thereafter provide the index and sector pulses while counting sectors in the same manner that occurs in the nondelayed mode of operation. After all sectors have been counted, generation of the sector pulses will be discontinued as in the nondelayed mode of operation.

Figure 14:
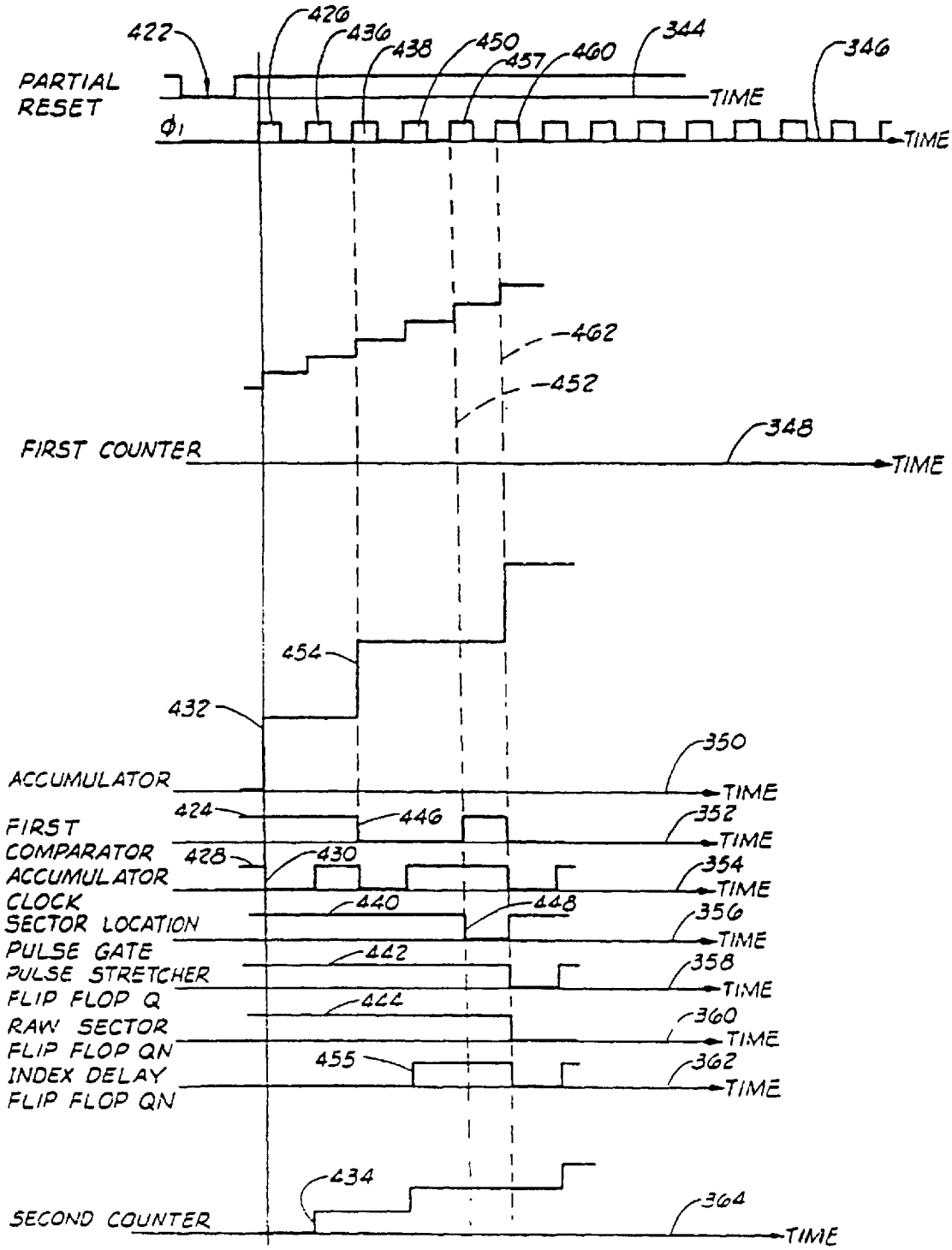
FIG. 14 is a timing diagram for a third mode of operation of the hard sectoring logic circuit.

FIG. 14 illustrates the operation of the circuit 22 in response to a partial reset pulse that occurs, as noted above, each time the transducer head is moved to a new track to which data is to be written or from which data is to be read. (Time lines in FIG. 14 have been given the same numerical designations as in FIGS. 12 and 13.) At the time the partial reset occurs, the first counter 102 will contain a count corresponding to the number of phase one clock pulses that have occurred since the most recent passage of index line 62 by the transducer head 36 and the second counter 150 will contain a count of the number of sectors, for the track being followed before the move, that have passed by the transducer head 36. The accumulator will contain the time that the next sector pulse is to be delivered for the track currently being followed.

During the partial reset, the delay and sector times for the new track to be followed are entered into the latches 122 and 124 and the number of sectors for the new track is set into the latch 144 as described above. Thus, before the move to the new track is initiated, the latches in circuit 22 are in a state to accumulate new delay and sector times and count sectors for the new track.

With the partial reset, indicated at 422 in FIG. 14, the accumulator 112 and the second counter 150 are both reset via a negative pulse from the AND gate 94 in FIG. 3. Thus, the count in first counter 102 will exceed the contents of the accumulator 112 to cause the output of the first comparator to go high as shown at 424 in FIG. 14. Moreover, the output of the first comparator will remain high until the value in the accumulator 112 exceeds the count in the first counter. In order for the accumulator contents to exceed the first counter contents, a series of accumulator clock pulses will be quickly generated. This will accumulate enough sector times to equal to the next sector time; that is, the time the transducer head 36 will reach the next sector for the new track, as will now be described.

Initially, and referring once again to FIG. 3, the complement of the partial reset pulse is also delivered via the AND gate 94 and inverter 172 to the reset terminal of the flip-flop 170 of the accumulator clock 118 so that the QN output thereof will be high as indicated at 428 in FIG. 14 just before the first phase one clock pulse 426 rises after the partial reset. At this time, the Q output of flip-flop 170 will be low so that, with the high output from the first comparator 108 being transmitted to the inverting input of the NOR gate 173, the output of such gate will be high. Thus, the QN output of the flip-flop 170 will be clocked low as indicated at 430 to give rise to a negative accumulator clock pulse that enters either the delay time for the new track or the sector time therefore into the accumulator 112 as at 432. Concurrently, this pulse will be counted by the second counter if no delay time has been selected for the new track but not counted if a delay time has been selected. As shown in FIG. 8, the flip-flop 214 is set by the partial reset pulse issuing as a combined reset from the AND gate 94 so that the accumulation time selector will select the delay time for this first entry of a time into the accumulator 112 and will thereafter select sector times as described above with respect to the delayed mode of operation described above. Similarly, the second counter will count the first entry of a time entered into the accumulator 112 only if no delay time has been selected for the new track. Otherwise, counting by the second counter will pick up with the succeeding accumulator clock pulse. For purposes of discussion, it will be assumed that the time entered into the accumulator is a sector time.

With the drop of the QN output of the flip-flop 170, the Q output thereof goes high so that the output of the NOR gate 173 will go low. The result is that the rise of the next clock pulse 436 will clock the QN output of the flip-flop 170 back high to result, under the assumption made above, in the counting of the accumulator clock pulse by the second counter 150 as at 434.

If the entry of the sector time for the new track into the accumulator 112 does not bring the contents thereof to the level of the count in the first counter 102, the output of the first comparator 108 will remain high and a second sector time accumulation and sector count, for the new track, will occur with the rise of the next clock pulse 438. The process will then be repeated until the accumulator 112 contents surpass the contents of the first counter 102. Thus, the combined operation of the first counter 102, the accumulator 112, the first comparator 108, the second counter 150 and the accumulator clock 118 is to count the number of sectors and next sector times that would have been counted subsequent to a master reset had the transducer head 36 been following the new track to which it has been moved. Thus, when the contents of the accumulator 112 finally surpass the contents of the first counter 102, indicated at 454 the counters 102 and 150 and the accumulator 112 will contain the same numbers, for the relative locations of the transducer head 36 and index 62, that such devices would have contained following a master reset had the head been following the new track. Thus, the operation of the circuit 22, in so far as the counting of sectors and sector times is concerned will subsequently be the same as the operation that has been described above for following a track after a master reset.

During the time that the next sector time is being loaded into the accumulator 112 and the sector number from index currently under the transducer head 36 is being loaded into the second counter, the generation of index and sector pulses used by the read/write controller 76 in the transfer of data to and from the disk 26 is suppressed as will now be discussed.

Referring to FIGS. 8 and 11, the complement of the partial reset pulse on conducting path 153 is transmitted by conducting path 211 (FIGS. 3 and 8) to one input of the NOR gate 210 of the delayed index controller so that, while the partial reset pulse is being generated, the output of NOR gate 210 will be active low and will be transmitted to the active low set terminal of the index delay flip-flop 308 on conducting path 212. Thus, the partial reset pulse will set the index delay flip-flop 308 in the same manner that such flip-flop is set in the delayed index mode of operation that has been described above to cause the output of the sector location pulse gate 300, the QN output of the raw sector flip-flop 312 and the Q output of the pulse stretcher flip-flop 310 to remain high, as indicated at 400, 442, and 444 respectively, until the first comparator output has gone low as in the delayed index mode of operation described above. Thus, when the accumulator 112 contents surpasses the contents of the first counter to cause the first comparator output to go low as at 446, the QN output of the index delay flip-flop 308 will be clocked high, as at 455, on the next phase one clock pulse 450 to enable the sector location pulse gate 300 output to go low, as at 448. The result is that the operation of the circuit 22 subsequent to the time indicated by the line 452 in FIG. 14, beginning with the first subsequent phase one clock pulse, indicated at 457, to raise the count in the first counter 102 to the value in the accumulator 112, will be the same as the operation thereof following the time indicated by the line 398 in FIG. 12. Thus, the next clock pulse, at 460, will cause another sector time to be entered into the accumulator 112 at the time indicated by line 462 in the same manner that a sector time is entered of line 402 of FIG. 12 and operation will thereafter continue as shown in FIG. 12 to the right of line 402.

It will be clear that the present invention is well adapted to carry out the objects and attain the ends and advantages mentioned as well as those inherent therein. While a presently preferred embodiment has been described for purposes for this disclosure, numerous changes may be made which will readily suggest themselves to those skilled in the art and which are encompassed in the spirit of the invention disclosed and as defined in the appended claims.

What is claimed is:

[1. In a rotating disk data storage device of the type including a disk whereon data is written by a transducer head adjacent the disk in angularly extending sectors on concentric data tracks to be subsequently read therefrom by the transducer; a controller responsive to sector location pulses for locating said sectors; and means for moving the transducer head between tracks on the disk; an apparatus for providing the sector location pulses, comprising:

master clock means synchronized with the rotation rate of the disk for providing master clock signals indicative of the angular location of the transducer head with respect to a selected index location on the disk following passage of the index location by the transducer head;

a first counter clocked by the clock means;

latch means for storing a selected time corresponding to a selected angular distance along a selected track on the disk;

an accumulator connected to the latch means for adding said selected time to the contents of the accumulator each time the accumulator is clocked by an accumulator clock signal;

a first comparator connected to the first counter and the accumulator for providing an electrical indication that the contents of the counter is at least as large as the contents of the accumulator;

accumulator clock means connected to the first comparator and responsive to said electrical indication for repetitively providing the accumulator clock signal to the accumulator so long as the accumulator contents does not exceed the first counter contents;

master reset means for resetting the first counter and the accumulator at such times that the index location on the disk passes the transducer head;

partial reset means for entering the selected time into the latch means and resetting the accumulator each time the transducer head is moved to a new track on the disk; and sector location pulse generation means, connected to the first comparator, for providing the sector location pulses to the controller in response to at least selected ones of said electrical indications that the contents of the first counter is at least as large as the contents of the accumulator.]

[2. The apparatus of claim 1 wherein the sector location pulse generation means comprises:

a sector location pulse gate connected to the first comparator to receive said electrical indication of the relative contents of the first counter and the accumulator; and means for generating a sector location pulse each time the sector location pulse gate is enabled;

wherein the apparatus further comprises:

a second counter clocked by the accumulator clock signals;

a number of sectors latch for storing the numbers of sectors on the tracks of the disk; and a second comparator connected to the second counter, the number of sectors latch and the sector location pulse gate for disabling the sector location pulse gate following attainment of the value stored in the number of sectors latch by the second counter.]

[3. The apparatus of claim 2 wherein the latch means is further characterized as a means for storing a plurality of numbers corresponding to selected angular distances along a selected track of the disk and wherein the latch means comprises:

a sector time latch for storing sector times corresponding to angular lengths of sectors on the tracks;

a delay time latch for storing delay times corresponding to selected angular skew distances of the sectors along tracks of the disk; and an accumulation time selector connected between the accumulator and the sector and delay time latches for presenting sector times to the accumulator in an enabled state of the selector and for presenting the delay times to the accumulator in a disabled state of the selector whereby the selected time added to the contents of the accumulator in response to clocking of the accumulator by an accumulator clock pulse is a sector time at such times that the accumulation clock pulse occurs while the accumulation time selector is enabled and is a delay time at such times that the accumulator clock pulse occurs while the accumulation time selector is disabled; and wherein the apparatus is further characterized as comprising delayed index controller means for disabling the accumulation time selector and the sector location pulse gate for the first accumulator clock signal following reset of the accumulator.]

[4. The apparatus of claim 3 wherein the sector location pulse generation means comprises means for selecting the duration of the sector location pulses.]

[5. The apparatus of claim 2 wherein the sector location pulse generation means comprises means for selecting the duration of the sector location pulses.]

[6. The apparatus of claim 1 wherein the sector location pulse generation means comprises means for selecting the duration of the sector location pulses.]

[7. The apparatus of claim 1 wherein the latch means is further characterized as a means for storing a plurality of numbers corresponding to selected angular distances along a selected track of the disk and wherein the latch means comprises:

a sector time latch for storing sector times corresponding to angular lengths of sectors on the tracks;

a delay time latch for storing delay times corresponding to selected angular skew distances of the sectors along tracks of the disk; and an accumulation time selector connected between the accumulator and the sector and delay time latches for presenting sector times to the accumulator in an enabled state of the selector and for presenting the delay times to the accumulator in a disabled state of the selector whereby the selected time added to the contents of the accumulator in response to clocking of the accumulator by an accumulator clock pulse is a sector time at such times that the accumulator clock pulse occurs while the accumulation time selector is enabled and is a delay time at such times that the accumulator clock pulse occurs while the accumulation time selector is disabled;

wherein the sector location pulse generation means comprises:

a sector location pulse gate connected to the first comparator to receive said electrical indication of the relative contents of the first counter and the accumulator; and means for generating a sector location pulse each time the sector location pulse gate is enabled; and wherein the apparatus is further characterized as comprising delayed index controller means for disabling the accumulation time selector and the sector location pulse gate for the first accumulator clock signal following reset of the accumulator.]

[8. The apparatus of claim 7 wherein the sector location pulse generation means comprises means for selecting the duration of the sector location pulses.]

[9. A method for generating sector location pulses for locating data storage sectors on data tracks of a rotating disk data storage device having a transducer head adjacent the surface of a rotating disk for writing to and reading from the data storage sectors, comprising the steps of:

maintaining a continuous count of a time from index following passage of a selected index location on the disk by the transducer head;

maintaining an accumulation of sector times, each sector time equal to the time required for a data storage sector to pass the transducer head along a selected track, following passage of the index location by the transducer head;

adding a sector time to said accumulation of sector times each time the time from index attains a value at least as large as the accumulation of sector times;

generating a sector location pulse each time the time from index attains a value at least as large as the accumulation of sector times;

setting the accumulation of sector times to zero each time the transducer head is moved to a new track on the disk; and repetitively accumulating sector times following movement of the transducer head to a new track on the disk until the accumulation of sector times exceeds the time from index.]

[10. The method of claim 9 further comprising the steps of:

maintaining a count of the number of sectors which have reached the transducer head following passage of the index location by the transducer head at such times that the transducer head is positioned adjacent a selected track on the disk;

discontinuing generation of sector location pulses at such times that the number of the sectors that have passed the transducer head reaches a preselected number of sectors for the selected track; and following movement of the transducer to a new track on the disk, updating the number of sectors count to an effective number of passed sectors between the index location and the location of the transducer head on the new track.]

[11. The method of claim 10 further comprising the step of accumulating a delayed index time to be added to the accumulation of sector times each time the index location on the disk passes the transducer head.]

[12. The method of claim 11 wherein the step of generating a sector location pulse is further characterized as generating a sector location pulse having one of a plurality of durations selected for each track on the disk.]

[13. The method of claim 9 further comprising the step of accumulating a delayed index time to be added to the accumulation of sector times each time the index location on the disk passes the transducer head and each time the transducer head is moved to a new track on the disk.]

[14. The method of claim 13 wherein the step of generating a sector location pulse is further characterized as generating a sector location pulse having one of a plurality of durations selected for each track on the disk.]

[15. The method of claim 9 wherein the step of generating a sector location pulse is further characterized as generating a sector location pulse having one of a plurality of durations selected for each track on the disk.]

*16. A method for determining a location of a sector for use with a hard disk assembly having at least one hard disk for storing digital information and a circuit configured to detect*

*an index signal generated at a predetermined angular orientation of said disk, comprising:*

*positioning a transducer head over a first track having a first number of sectors;*

*detecting a first index signal while the transducer head is positioned over the first track;*

*positioning the transducer head over a second track having a second number of sectors different than the first number of sectors;*

*reading a sector time related to a time it takes for a data storage sector to pass the transducer head along the second track;*

*determining an angular location of the transducer head relative to the predetermined angular orientation while the transducer head is positioned over a first sector in the second track; and*

*determining at least partly from the angular location of the transducer head and the sector time, the location of the next sector to pass under the transducer head before the occurrence of a second index signal.*

*17. The method as defined in claim 16, further comprising clocking a counter in proportion to a disk rotation rate, wherein the counter count is used to determine the angular location of the transducer head relative to the predetermined angular orientation.*

*18. The method as defined in claim 16, further comprising maintaining an accumulation based on the sector time.*

*19. The method as defined in claim 18, further comprising:*

*comparing data related to the angular location of the transducer head with data related to the accumulation; and*

*selectively continuing to accumulate said sector time based at least partly on said comparison.*

*20. The method as defined in claim 18, further comprising:*

*comparing data related to the angular location of the transducer head with data related to the accumulation; and*

*generating a sector location signal based at least partly on said comparison.*

*21. The method as defined in claim 18, further comprising resetting the accumulation to a predetermined value when the transducer head is moved to a new track on the disk having a different number of sectors than the previous track.*

*22. A method for locating data storage sectors on a magnetic drive have at least one disc with a plurality of tracks, comprising:*

*positioning a transducer head over a first track having a first number of sectors;*

*receiving a first index signal related to an index location;*

*positioning the transducer head over a second track having a second number of sectors different than the first number of sectors;*

*determining the position of the transducer head relative to the index location based at least in part on the first index signal; and*

*locating a first sector in the second track before an occurrence of a second index signal based at least in part on a length of a sector in the second track and the position of the transducer relative to the index location.*

*23. The method as defined in claim 22, further comprising:*

*accumulating a value related to the length of a sector in the second track;*

*comparing data related to an angular position of the transducer head relative to the index location with data related to the accumulation of the value; and*

*generating a sector location signal based at least partly on said comparison.*

*24. The method as defined in claim 23, further comprising:*

*maintaining a count of the number of sectors which have reached the transducer following passage of the index location by the transducer when the transducer is positioned over the second track; and*

*discontinuing generation of sector location signals when the number of sectors that have passed the transducer reaches a pre-selected number of sectors.*

*25. The method as defined in claim 23, further comprising:*

*maintaining a count of the number of sectors which have reached the transducer following passage of the index location by the transducer when the transducer is positioned over the second track; and*

*following movement of the transducer to a new track on the disk, updating the count of the number of sectors to an effective number of passed sectors between the index location and the location of the transducer on the new track.*

*26. The method as defined in claim 23, wherein generating a sector location signal is further characterized as generating a sector location signal having one of a plurality of durations, wherein the first track is associated with a first sector location signal duration and the second track is associated with a second sector location signal duration.*

*27. A method for determining a location of a sector of a disk, comprising:*

*positioning a transducer head over a first track having a first number of sectors;*

*detecting a first index signal;*

*positioning the transducer head over second track having a second number of sectors;*

*reading a sector time related to a time it takes for a sector to pass the transducer head along the second track;*

*determining an angular location of the transducer head while it is positioned over a first sector in the second track; and*

*determining the location of a next sector to pass under the transducer head before an occurrence of a second index signal.*

*28. The method of claim 27 wherein the first and second number of sectors are different.*

*29. The method of claim 28 wherein the angular location is relative to a predetermined angular orientation.*

*30. The method of claim 28 further comprising clocking a counter in proportion to a disk rotation rate.*

*31. The method of claim 30 wherein the counter is used to determine the angular location.*

*32. The method of claim 27 further comprising maintaining an accumulation based on the sector time.*

*33. A method for locating data storage sectors, comprising:*

*positioning a transducer over a first track having a first number of sectors;*

*receiving a first index signal related to an index location;*

*positioning the transducer over a second track having a second number sectors;*

*determining a position of the transducer based on the first index signal; and*

*locating a first sector in the second track before an occurrence of a second index signal.*

*34. The method of claim 33 wherein the second index signal is based on a length of a sector in the second track and a position of the transducer relative to the index location.*

*35. A rotating disk data storage device, including a disk whereon data is intended to be written in sectors on data tracks to be subsequently read therefrom by a transducer, wherein at least a first track has a first number of sectors and at least a second track has a second number of sectors, comprising:*

*a location circuit synchronized with the rotation rate of the disk, the location circuit configured to determine the angular location of the transducer head with respect to a selected index location on the disk;*

*a memory used to store a first value corresponding to a selected angular distance along a selected track on the disk;*

*an accumulator circuit connected to the memory, wherein the accumulator adds the first value to the contents of the accumulator in response to an accumulator clock signal;*

*a first comparator connected to the location circuit and the accumulator, wherein the first comparator is configured to compare data related to the angular location of the transducer head with the contents of the accumulator and generate corresponding comparison results; and*

*a sector location signal generator circuit coupled to the first comparator, wherein the sector location signal generator circuit is configured to provide sector location signals in response to at least selected ones of said comparison results.*

*36. The rotating disk data storage device as defined in claim 35, wherein the location circuit includes a clock generation circuit which generates a clock signal synchronized with the rotation rate of the disk, further comprising a counter clocked by the clock signal.*

*37. The rotating disk data storage device as defined in claim 36, further comprising a reset circuit configured to reset the counter to a first value at least partly in response to determining that the index location on the disk passed the transducer head.*

*38. The rotating disk data storage device as defined in claim 36, further comprising a reset circuit configured to reset the accumulator circuit to a first value at least partly in response to determining that the index location on the disk passed the transducer head.*

*39. The rotating disk data storage device as defined in claim 36, further comprising a reset circuit configured to set the accumulator circuit to a first value at least partly in response to moving the transducer from a first track to a second track.*

*40. A circuit for generating sector location signals used to locate data storage sectors on data tracks of a rotating disk data storage device having a transducer head adjacent the surface of a rotating disk for writing to and reading from the data storage sectors located on disk tracks, wherein at least a first track has a first number of sectors and at least a second track has a second number of sectors, comprising:*

*a location circuit disk configured to determine the angular location of the transducer head with respect to a first reference location;*

*a first memory configured to store a plurality of values related to sector lengths associated with corresponding tracks; and*

*a sector location signal generation circuit configured to generate a sector location signal at least partially based on the value associated with the sector length for the track over which the transducer head is being positioned and the angular location of the transducer head with respect to the first reference location.*

*41. The circuit as defined in claim 40, further comprising:*

*a second memory used to store a value corresponding to a selected angular distance along a selected track on the disk; and*

*an accumulator connected to the memory, wherein the accumulator is configured to repeatedly add the selected time to the contents of the accumulator in response to a first signal.*

*42. The circuit as defined in claim 40, further comprising a comparator connected to the location circuit and the accumulator, wherein the first signal is selectively generated in response to a first comparison result generated by the comparator.*

*43. The circuit as defined in claim 40, further comprising a sector location signal generator connected to the comparator, the sector location signal generator configured to selectively generate sector signals at least partly in response to comparison results of a first type.*

*44. An apparatus comprising:*

*a location circuit configured to determine an angular location of a transducer head according to a selected index location on a disk;*

*a memory used to store a first value corresponding to a selected angular distance along a selected track on the disk;*

*an accumulator configured to add the first value to a content of the accumulator in response to an accumulator clock signal;*

*a first comparator coupled to the location circuit and the accumulator to compare data related to the angular location and the content and generate a result; and*

*a generator coupled to the first comparator to provide a sector location signal in response to the result.*

*45. The apparatus of claim 44 wherein the location circuit includes a clock circuit which generates a clock signal.*

*46. The apparatus of claim 45 further comprising a counter clocked by the clock signal.*

*47. The apparatus of claim 46 further comprising a reset circuit configured to reset one of the counter and the accumulator to a first value when the index location passed the transducer head.*

*48. The apparatus of claim 46 further comprising a reset circuit configured to reset the accumulator when the transducer head in response to moving the transducer from a first to second track.*

*49. An apparatus comprising:*

*a location circuit configured to determine an angular location of a transducer head;*

*a first memory configured to store a value related to a sector length associated with a track of a disk; and*

*a generator configured to generate a sector location signal base on the value associated with the sector length for a track over which the transducer head is being positioned and the angular position of the transducer head.*

*50. The apparatus of claim 49, further comprising:*

*a second memory configured to store a selected time to corresponding to a selected angular distance along a selected track on the disk; and*

*an accumulator having a content coupled to the memory, wherein the accumulator is configured to add the selected time to the content in response to a first signal.*

*51. The apparatus of claim 50, further comprising a comparator coupled to the location circuit and the accumulator to generate a result.*

*52. The apparatus of claim 51, wherein the first signal is selectively generated in response to the result.*

*53. A system comprising:*

*an interface coupled to a computer to receive information;*

*a controller coupled to the interface to control read/write information on a disk having a surface;*

*a transducer head adjacent to the surface for writing to and reading from a sector located on a disk, and*

*a device configured to locate the sector on the disk, the device comprising:*

*a location circuit configured to determine an angular location of the transducer head;*

*a first memory configured to store a value related to a sector length associated with a track of the disk; and*

*a generator configured to generate a sector location signal base on the value associated with the sector length for track over which the transducer head is being positioned and the angular position of the transducer head.*

*54. The system of claim 53, further comprising:*

*a second memory configured to store a selected time to corresponding to a selected angular distance along a selected track on the disk; and*

*an accumulator having a content coupled to the memory, wherein the accumulator is configured to add the selected time to the content in response to a signal.*

*55. The system of claim 54, further comprising a comparator coupled to the location circuit and the accumulator to generate a result.*

* * * * *